United States Patent [19]

Nagahashi et al.

[11] Patent Number: 6,106,047
[45] Date of Patent: Aug. 22, 2000

[54] WINDOW MOLDING, METHOD AND APPARATUS FOR PRODUCING SAME

[75] Inventors: Yuuji Nagahashi; Sumito Ichinohe; Hiroyoshi Imura; Takashi Hirokawa, all of Chiba, Japan

[73] Assignees: Kinugawa Rubber Ind. Co., Ltd.; Tokiwa Chemical Industry Co., Ltd., both of Chiba, Japan

[21] Appl. No.: 08/912,807

[22] Filed: Aug. 19, 1997

[30] Foreign Application Priority Data

Aug. 21, 1996 [JP] Japan ................................. 8-219550
Oct. 4, 1996 [JP] Japan ................................. 8-263933
Oct. 29, 1996 [JP] Japan ................................. 8-286253

[51] Int. Cl.$^7$ ........................................... B60J 10/02
[52] U.S. Cl. ................................... 296/93; 53/208
[58] Field of Search ...................... 296/93, 146.15; 52/208, 204.591, 204.597

[56] References Cited

U.S. PATENT DOCUMENTS

| | | | |
|---|---|---|---|
| 4,880,674 | 11/1989 | Shimizu | ................................. 428/31 |
| 5,174,623 | 12/1992 | Yada et al. | ................................. 296/93 |
| 5,456,049 | 10/1995 | Goto et al. | ................................. 52/208 |

FOREIGN PATENT DOCUMENTS 40 6211044   8/1994   Japan ....................... 296/93

*Primary Examiner*—D. Glenn Dayoan
*Assistant Examiner*—Paul Chenevert
*Attorney, Agent, or Firm*—Foley & Lardner

[57] ABSTRACT

A window molding installed at a clearance between a front window and a window frame of an automotive vehicle has an upper molding and a side molding continuous in the longitudinal direction. The side molding has a strut portion which is formed between a head portion for covering the clearance and a leg portion inserted to the clearance so that a length of the strut portion and an angle between the head portion and a glass limiting lip connected to the leg portion are gradually increased from an end of the side molding connected to the upper molding to the other end. The window molding is produced by extrusion molding by means of an apparatus using a fixed die head and a movable die head.

10 Claims, 20 Drawing Sheets

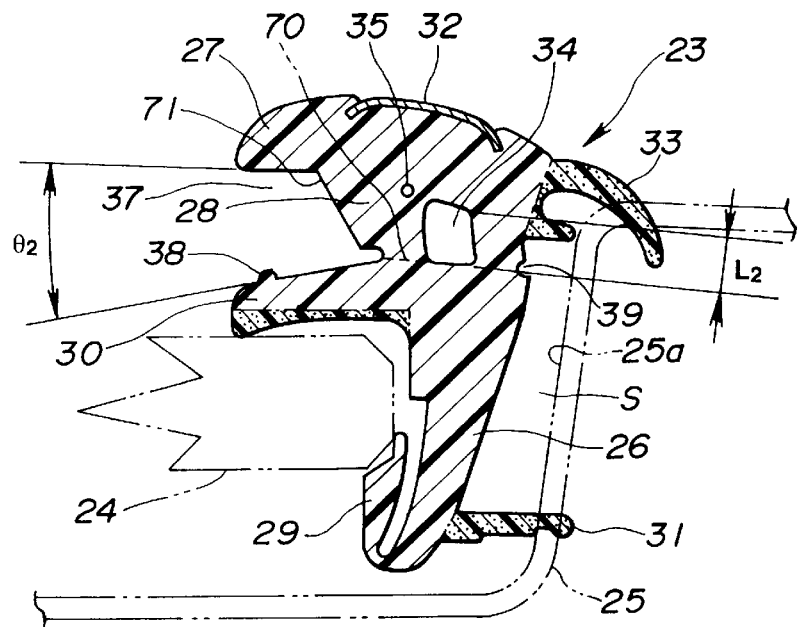

WINDOW MOLDING, METHOD AND APPARATUS FOR PRODUCING SAME

BACKGROUND OF THE INVENTION

The present invention relates to a window molding applied to a front window of an automotive vehicle, a method and an apparatus for producing the same.

Various window moldings and methods of producing the same have been proposed and are in practical use. Japanese Patent Provisional Publications Nos. 8-25385 and 7-285329 respectively disclose typical window moldings and methods of producing the same. The window molding disclosed in the Japanese Patent Provisional Publication No. 8-25385 is formed such that a side molding 304 having a rainwater guide groove 303 is integrally molded with an upper molding 306 installed at an upper portion of a front window 307, as shown in FIGS. 26 and 27. The rainwater guide groove 303 is defined by a head portion 309 for covering a clearance between the front window 307 and a vehicle body 312, a glass limiting lip 311 for sealingly pressing the front window 307 and a strut portion 310 extending from a leg portion 308 inserted between the clearance. The head portion 309 and the glass limiting lip 311 in the upper molding 306 are overlapped with each other and united so as not to define the rainwater guide groove 303. The length of the strut portion 310 is gradually increased from a connecting portion between the upper and side moldings 306 and 304 to the other end of the side molding 304 so as to increase the volume of the rainwater guide groove 303.

On the other hand, the window molding 370 of the Japanese Patent Provisional Publications No. 7-285329 is arranged such that a head portion 374 and a glass limiting lip 378 are overlapped and connected to form a closed hollow 380 therebetween. The hollow 380 at an upper molding 371 is thin and constant in cross section, and the hollow 380 at the side molding 372 is gradually increased such that a surface 374a receiving rainwater is gradually increased in its height H from $H_1$ to $H_2$ as shown in FIGS. 28 and 29. This window molding 370 is molded by an apparatus including an upper fixed die head 353 for extruding an upper part of the window molding 370 and a lower rotatable die head 354 for extruding a lower part of the window molding 370 as shown in FIG. 30.

However, the former window molding has a limitation that a projecting amount of the head portion 309 from an outboard surface of the vehicle body 312 becomes too large if a volume of the rainwater guide groove 303 is sufficiently ensured. On the other hand, the latter window molding 370 is molded such that a leg portion 373 is gradually twisted according to the change of the height of the head portion 374 with respect to the upper surface of the head portion 374. Therefore, the leg portion 373 of the side molding 372 is twisted with respect to the leg portion 373 of the upper molding 371. This twist applies twisting force to the leg portion 373 of the side molding 372 when corrected by a sizing jig and may degrade the positional and shaped accuracy of the leg portion 373 of the side molding 372.

SUMMARY OF THE INVENTION

It is an object of the present invention to provide an improved window molding, an improved method and an improved apparatus for producing the window molding for an automotive vehicle.

Another object of the present invention is to provide a method and an apparatus which produce a high accuracy window molding while improving its productivity.

A first aspect of the present invention resides in a window molding which is for an automotive vehicle and comprises an upper molding and a side molding vehicle. The upper molding includes a leg portion which is disposed between a periphery of a front window glass of the automotive vehicle and a window frame of a vehicle body, a glass limiting lip which projects from the leg portion and is in contact with an outer board surface of the periphery of the front window glass, and a head portion which is connected to the leg portion and the glass limiting lip. The side molding is continuous with the upper molding. The side molding includes a leg portion glass and a glass limiting lip which are as same as those of the upper molding. The side molding further includes a strut portion which is connected to the leg portion. A head portion is connected to the strut portion. A length of the strut portion and an angle between the head portion and the glass limiting lip are gradually increased from an end of the side molding connected to the upper molding to the other end.

Another aspect of the present invention resides in a method for producing the window molding mentioned in the first aspect. The method comprises a step for extruding a first intermediate molding including the strut portion and the head portion from a first die head, a step for extruding a second intermediate molding including the glass limiting lip and the leg portion from a second die head, a step for integrally connecting the first and second intermediate moldings and a step for continuously changing a length of the strut portion and an angle between the glass limiting lip and the head portion synchronously with the extruding operation of the first and second intermediate moldings.

Further another aspect of the present invention resides in an apparatus for producing the window molding mentioned in the first aspect. The apparatus comprises a first die head, a first intermediate molding changing means and a second die head. The first die head extrudes a first intermediate molding including the strut portion and the head portion. The first intermediate molding changing means continuously changes a length of the strut portion and an angle between the glass limiting lip and the head portion synchronously with the extruding operation of the first intermediate molding. The second die head extrudes a second intermediate molding including the glass limiting lip and the leg portion, said second die head being disposed at a position where the first intermediate molding treated by said first intermediate molding changing means is supplied to be integrally connected with the second intermediate molding.

BRIEF DESCRIPTION OF THE DRAWINGS

FIG. 3 is a cross-sectional view taken in the direction of III—III line of FIG. 1;

FIG. 4 is a cross-sectional view taken in the direction of IV—IV line of FIG. 1;

DETAILED DESCRIPTION OF THE INVENTION

Figure 1:
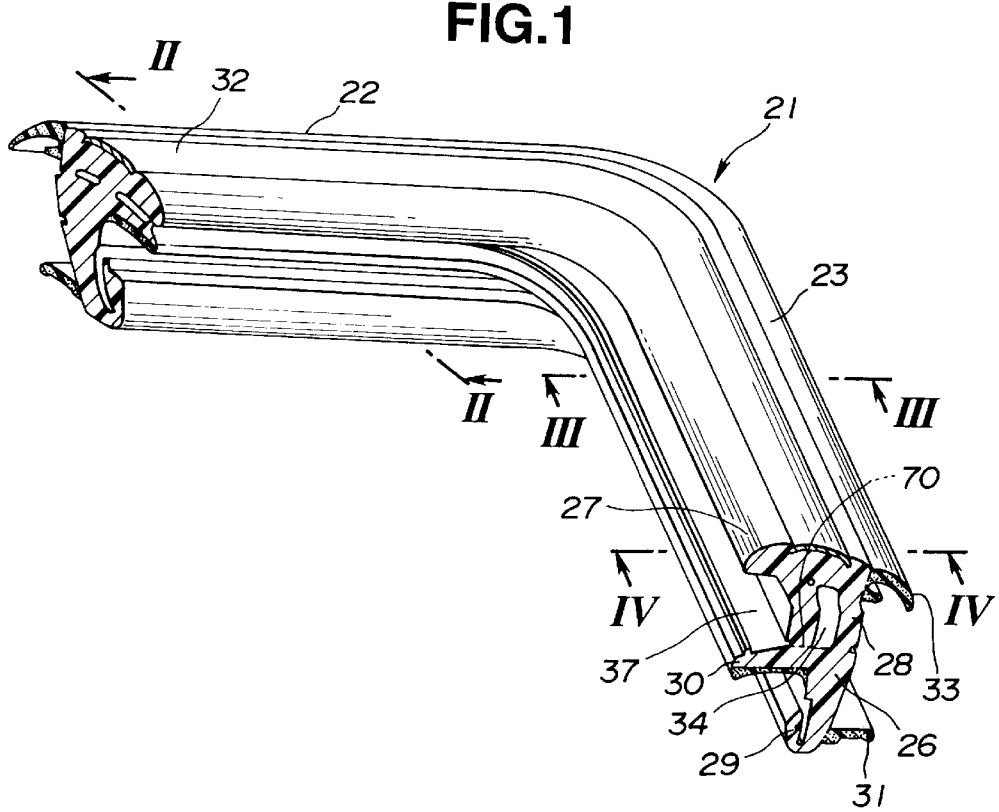
FIG. 1 is a perspective view showing a window molding of a first embodiment according to the present invention.

Referring to FIGS. 1 to 10, there is shown a first embodiment of a window molding, a method and an apparatus for producing the window molding according to the present invention.

The window molding 21 is installed to a peripheral portion of a front window glass of the automotive vehicle. The window molding 21 is constituted by an upper molding 22 installed at an upper side portion of the peripheral portion of the front window glass 24 and a side molding 23 installed at a vertical side portion of the peripheral portion of the front window glass 24. The window molding 21 is made of resin material and is continuously formed (extruded) by extrusion molding.

The window molding 21 comprises a leg portion 26 to be inserted to a clearance S between the front window glass 24 and a vehicle-body window frame portion 25 such as a front periphery of the vehicle body roof portion or a front periphery of a front pillar, a decorative head portion 27 for covering the clearance S, a strut portion 28 interconnecting the leg portion 26 and the decorative head portion 27. A hooked lip 29, a glass limiting lip 30 and a lower lip 31 are projected from the leg portion 26 toward the vehicle body. The hooked lip 29 is in contact with an inboard edge of the peripheral portion of the front window glass 24. The glass limiting lip 30 is in contact with an outboard surface of the peripheral surface of the front window glass 24. The lower lip 31 is in contact with an inboard bent wall 25a of the vehicle body window frame portion 25. The decorative head portion 27 extends from a connecting portion of the strut portion 28 toward the peripheral portion of the front window glass 24 so as to form a hood shaped portion. A bright film 32 is embedded on an upper surface of the decorative head portion 27 so as to improve the appearance thereof. An upper lip 33 having two lips is extended from an end portion of the decorative head portion 27 which end portion is opposite to the end extending toward the front window glass 24. The upper lip 33 is in contact with an outboard corner of the vehicle body window frame portion 25.

The strut portion 28 is formed to have a hollow portion 34 therein in order to reduce the weight of the window molding 21. The upper lip 33, the lower lip 31 and a lower part (a side in contact with the front window glass 24) of the glass limiting lip 30 are made of soft resin material, and the other parts of the window molding 21 are made of hard resin material. A core wire 35, which is formed into a rope made of glass fibers, is embedded in the decorative head portion 27 to suppress expansion of the window molding 21 in the longitudinal direction.

Figure 2:
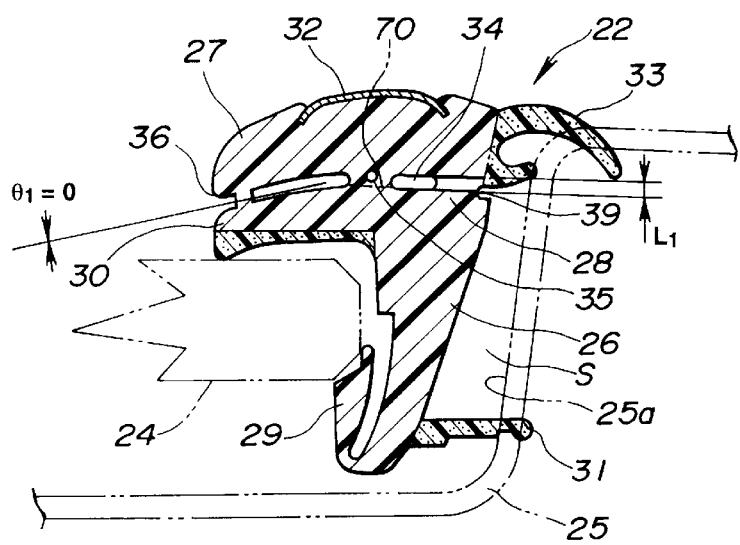
FIG. 2 is a cross-sectional view taken in the direction of II—II line of FIG. 1.

A normal portion such as a portion of the upper molding 22 except for both end portions is formed such that the strut portion 28 is formed extremely short. A lower surface of a tip end portion of the decorative head portion 27 is interconnected with an upper surface of the glass limiting lip 30 through the narrow width connecting wall 36, as shown in FIG. 2. Therefore, the glass limiting lip 30 and the decorative head portion 27 are overlapped with each other so that the height dimension from the lower surface of the glass limiting lip 30 to the upper surface of the decorative head portion 27 becomes sufficiently small. In this condition, the decorative head portion 27 and the glass limiting lip 30 are generally arranged in parallel.

In contrast, as shown in FIGS. 3 and 4, the side molding 23 is arranged such that the strut portion 28 is formed long. A rainwater guide groove 37 is defined by the lower surface of the decorative head portion 27, an upper surface of the glass limiting lip 30 and a glass side surface of the strut portion 28 so as to have a cross-section of an outwardly opened channel shape. An upper portion of the glass side surface of the strut portion 28 is formed to be gradually inclined toward the tip end portion of the decorative head portion 27. Hereinafter, this part is called as an inclining portion 71.

The rainwater guide groove 37 is formed such that the cross-sectional shape thereof is continuously changed from each of the both end portions of the upper molding 22 toward the lower portion of the side molding 23. That is, the length of the strut portion 28 is gradually increased from each of the both end portions of the upper molding 22 toward the lower portion of the side molding 23 such that $L_1 \rightarrow L_2 \rightarrow L_3$ as shown in FIGS. 2, 3 and 4. In addition, the cross section of the side molding 23 is changed such that the angle formed by the decorative head portion 27 and the glass limiting lip 30 is gradually increased to be $\theta_1 \rightarrow \theta_2 \rightarrow \theta_3$ as shown in FIGS. 2, 3 and 4. The change of the angle formed by the decorative head portion 27 and the glass limiting portion 30 is obtained by inclining a connecting surface 70 of a lower portion of the strut portion 28 with respect to the upper end of the leg portion 26 as will be mentioned later.

The upper molding 22 of the window molding 21 installed at the upper side of the front window glass 24 is formed such that the decorative head portion 27 and the glass limiting lip 30 are connected with each other in an overlapped condition and that the thickness thereof becomes as thin as possible. Therefore, the front window glass 24 and the vehicle body roof are smoothly continued by means of the front window molding 21 so that the part from the front window glass 24 to the vehicle body roof becomes a flush surface. This construction suppresses the generation of the turbulence of air at this portion during a vehicle running condition.

At the portion from each of the both end portions of the upper molding 22 to the lower end portion of the side molding 23, the length of the strut portion 28 is formed long so as to form a rainwater guide groove 37 between the decorative head portion 27 and the glass limiting lip 30. Therefore, even if rainwater hitting on the front window glass 24 is flowed toward a side window glass due to the operation of a wiper or air flow force during the running under raining, the rainwater is certainly caught by the rainwater guide groove 37. Particularly, in a window molding 21, the length of the strut portion 28 is increased from each end portion of the upper molding 22 to the lower portion of the side molding 23, and the angle formed by the decorative head portion 27 and the glass limiting lip 30 is gradually increased. Therefore, the volume of the rainwater guide groove 37 is ensured to be sufficiently large without largely projecting the decorative head portion 27 from the front pillar. Accordingly, even if a lot of rainwater hits the front window glass 24 during the running under raining, the rainwater flowing to the side of the vehicle body is certainly caught by the large-volume rainwater guide groove 37. This certainly prevents the rainwater hitting on the front window glass 24 from being directly flowing to the side window mirror and a door mirror.

Although the rainwater guide groove 37 is arranged such that the strut portion 28 is inclined toward the vehicle body window frame portion 25 according to the approach to the lower portion of the side molding 23, the caught rainwater is certainly dropped downward along the front window glass 24 since the inclining portion 71 continuing to the lower surface of the decorative head portion 27 is taperedly formed at the bottom surface of the rainwater guide groove 37.

Next, the method for producing the window molding 21 will be discussed hereinafter.

FIGS. 5 to 9 disclose an extrusion molding apparatus for producing the window molding 21. The extrusion molding apparatus is constituted by a first die head 41 having a main extrude opening 40 and a second die head 43 having an auxiliary extrude opening 42. The second die head 43 is fittingly overlapped on an extrusion front surface of the first die head 41. The main extrude opening 40 of the first die head 41 is formed such that a main shape portion 33 for forming the decorative head portion 27 including the upper lip portion 33 and a connecting portion for forming the strut portion 28 are extruded. The auxiliary extrude opening 42 of the second die head 43 is formed into an opening shape for forming the leg portion 26, the glass limiting lip 30, the hook lip 29 and the lower lip 31.

The first die head 41 is fixedly installed to a base (not shown), and resin material is supplied from a supply port of the base to the first die head 41. In this embodiment, the normal portion of the decorative head portion 27 is formed of the hard resin material and the lip portion 33 of the decorative head portion 27 is made of soft resin material. Two material supply conduits are installed to the first die head 41.

Figure 5:
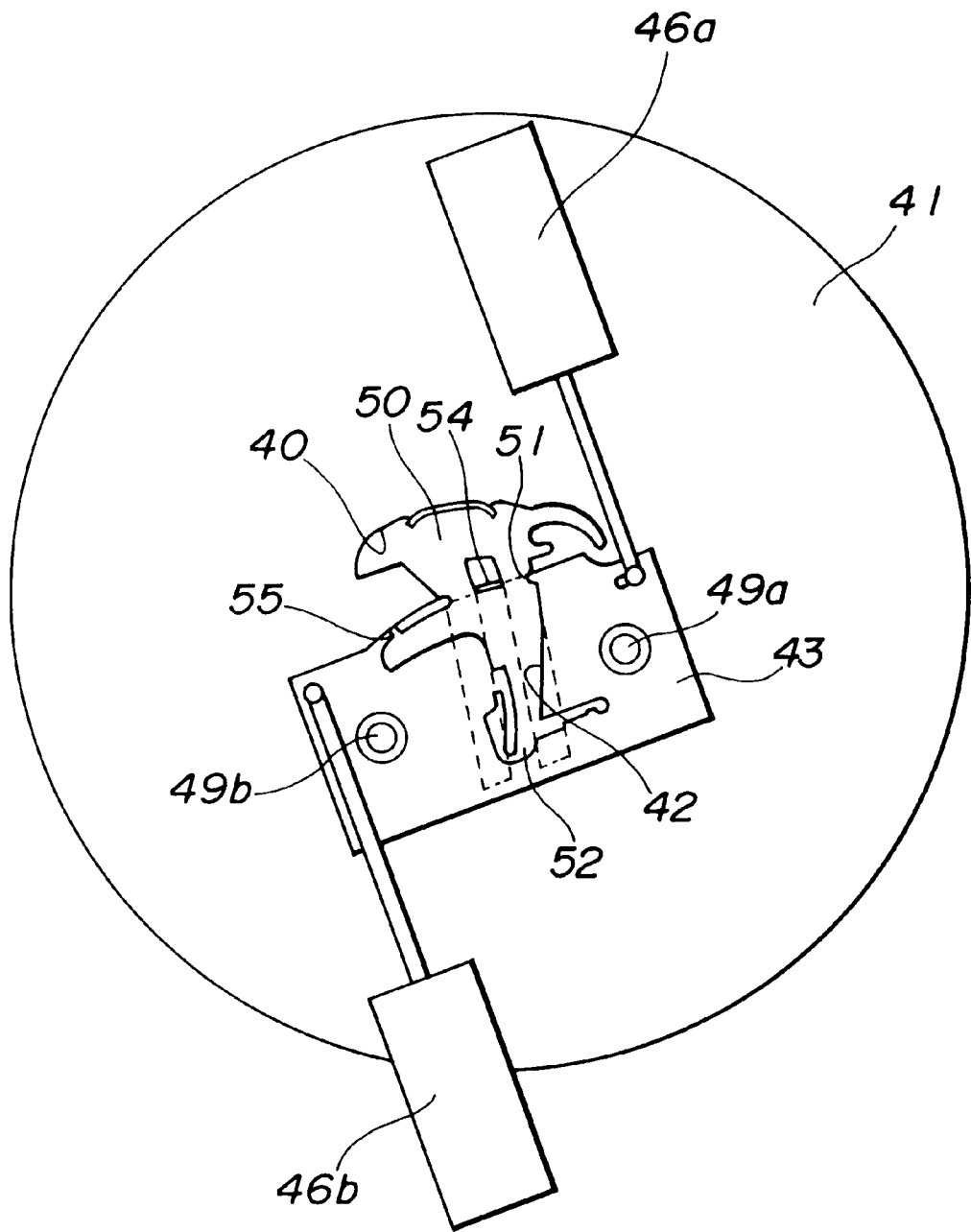
FIG. 5 is a front view which shows an extruding mold apparatus for producing the window molding in accordance with the present invention.

The second die head 42 is rotatably supported by a pair of drive cylinders 46a and 46b as shown in FIG. 5. By operating the drive cylinders 46a and 46b in the longitudinal direction thereof, the second die head 43 is vertically and rotatably moved on the first die head 41. By the movements of the second die head 43 on the first die head 41, the opening shape formed by the combination of the main extrude opening 40 of the first die head 41 and the auxiliary extrude opening 42 of the second die head 43 is continuously changed.

Figure 6:
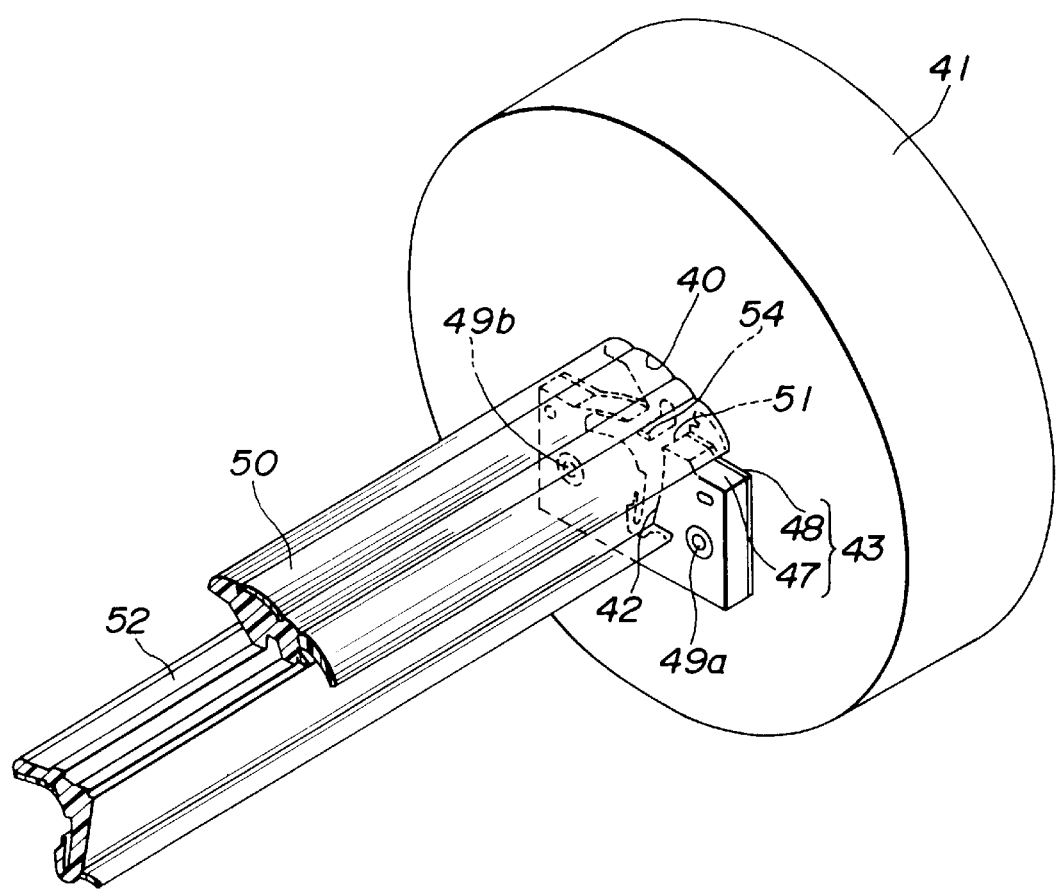
FIG. 6 is a perspective view which shows an extruding mold apparatus for producing the window molding in accordance with the present invention.
Figure 7:
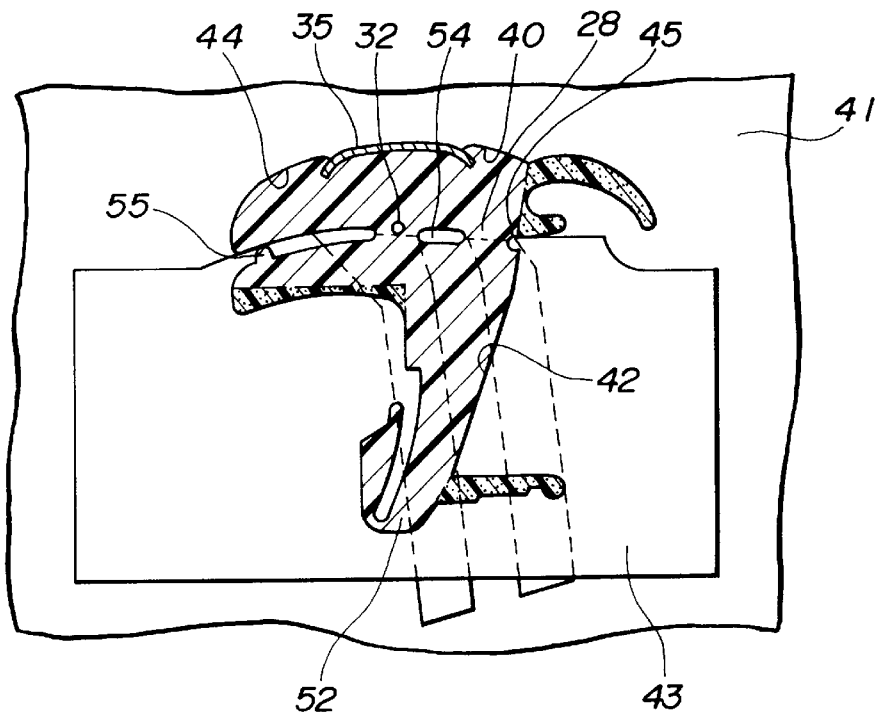
FIG. 7 is a front view which shows the extruding ports of the first and second die heads of the extrusion molding apparatus according to the present invention.

The second die head 43 is constituted by a die head plate 47 having the auxiliary extrude opening 42 and a shield plate 48 connected to a back side of the die head plate 47, as shown in FIG. 6. First and second material supply ports 49a and 49b for supplying material to the auxiliary extrude opening 42 are formed on the front side of the die head plate 47. Soft resin material to be supplied to the parts corresponding to the lower lip 31 and the lower half portion of the glass limiting portion 30 is supplied to the first material supply port 49a. Hard resin material to be supplied to the parts corresponding to the other leg portion 26 is supplied to the second material supply port 49b. The shield plate 48 is arranged to properly shield the connecting portion 45 of the first die head 41 according to the displacement of the second die head 43, so that the length of the strut portion 28 of the first extruded molding extruded from the first die head 41 and the angle of the connecting surface 70 of the first extrude molding 50 are changed.

A connect opening 51 for communicating the auxiliary extrude opening 42 with the main extrude opening 40 is formed at an upper surface of the die head plate 47. The connect opening 51 is opened toward the connecting surface 70 of the first extrude molding 50 defined by the shield plate 48. Accordingly, a part of the hard resin material supplied from the second material supply port 49b is flowed toward the first intermediate molding 50 so that the second intermediate molding 52 is formed by the auxiliary extrude opening 42 and is simultaneously connected with the first intermediate molding 50. A separation plate 54 for forming the hollow portion 34 is installed at the shield plate 48 so as to divide the connect opening 51.

A small width opening 55 for upwardly opening from the part corresponding to the glass limiting lip 30 of the auxiliary extrude opening 42 at an upper surface of the die head plate 47. Accordingly, when the resin material is extruded from the first and second die heads 41 and 43 in a condition that the length of the connecting portion 45 of the first die head 41 is set shortest by raising up the second die head 43, the corresponding part to the glass limiting lip 30 of the second extrude molding 52 and the corresponding part to the decorative head portion 27 of the first extrude molding 50 are connected by the resin material flowed through the small width opening 55.

With the thus arranged apparatus according to the present invention, when the window molding 21 is produced, the relative height and the inclined angle of the second die head 43 with respect to the first die head 41 are first set in initial set condition by operating the drive cylinders 46a and 46b. Then, the resin material is extruded from the first and second die heads 41 and 43. That is, when the production of the window molding 21 is started from the upper molding 22, the second die head 43 is raised up at a predetermined position so as to maintain the length of the connecting portion 45 of the first die head 41 smallest and the glass limiting lip 30 corresponding part is set to be parallel with the decorative head portion 27 corresponding part. Then, the extrusion molding is started.

The core member 35 and the bright film 32 are simultaneously extruded with the predetermined resin material from the main extrude opening 40 of the first die head 41. Therefore, the first extrude molding 50 is formed to include the core member 35 and the bright film 32. Further, the strut portion 28 of the first extrude molding 50 is cut shortly and horizontally by the shield plate 48 of the second die head 47. On the other hand, the second extrude molding 52 is extruded from the auxiliary extrude opening 42 of the second die head 43. At this time, the material extruded from the connect opening 51 of the upper surface of the die head plate 47 is connected with the connecting surface 70 of the strut portion 28 of the first intermediate molding 50. Since the corresponding part to the decorative head portion 27 of the first die head 41 and the corresponding part of the glass limiting lip 30 of the second die head 43 are most adjacently displaced at this time, the material flowed through the small width opening 55 of the second die head 43 is connected to the lower surface of the decorative heat portion 27 of the first extrude molding 50 such that the decorative head portion 27 is overlapped and fixedly connected with the glass limiting lip 30.

Figure 8:
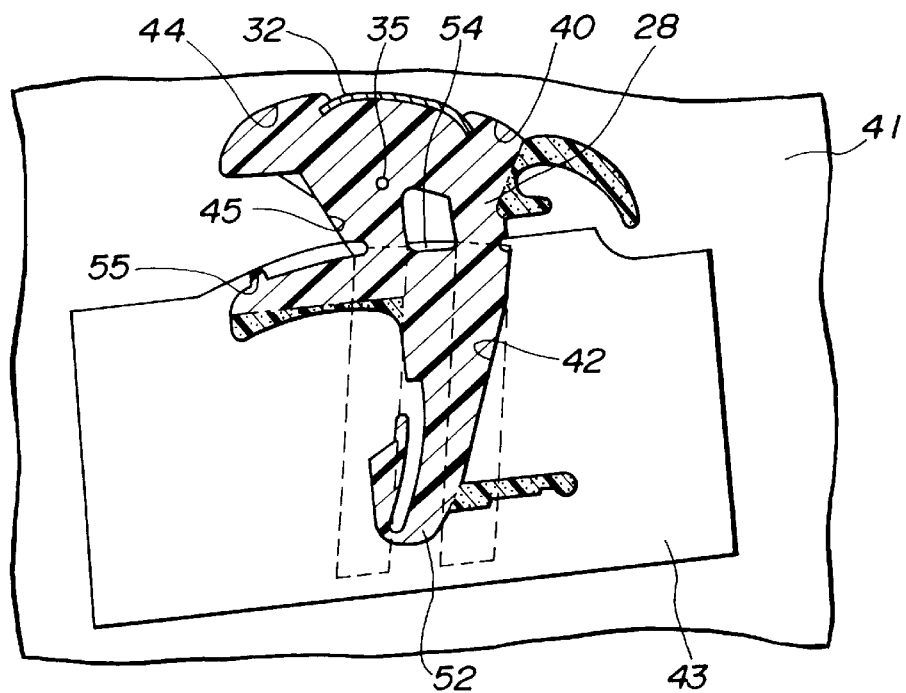
FIG. 8 is a front view which shows the extruding ports of the first and second die heads of the extrusion molding apparatus according to the present invention.
Figure 9:
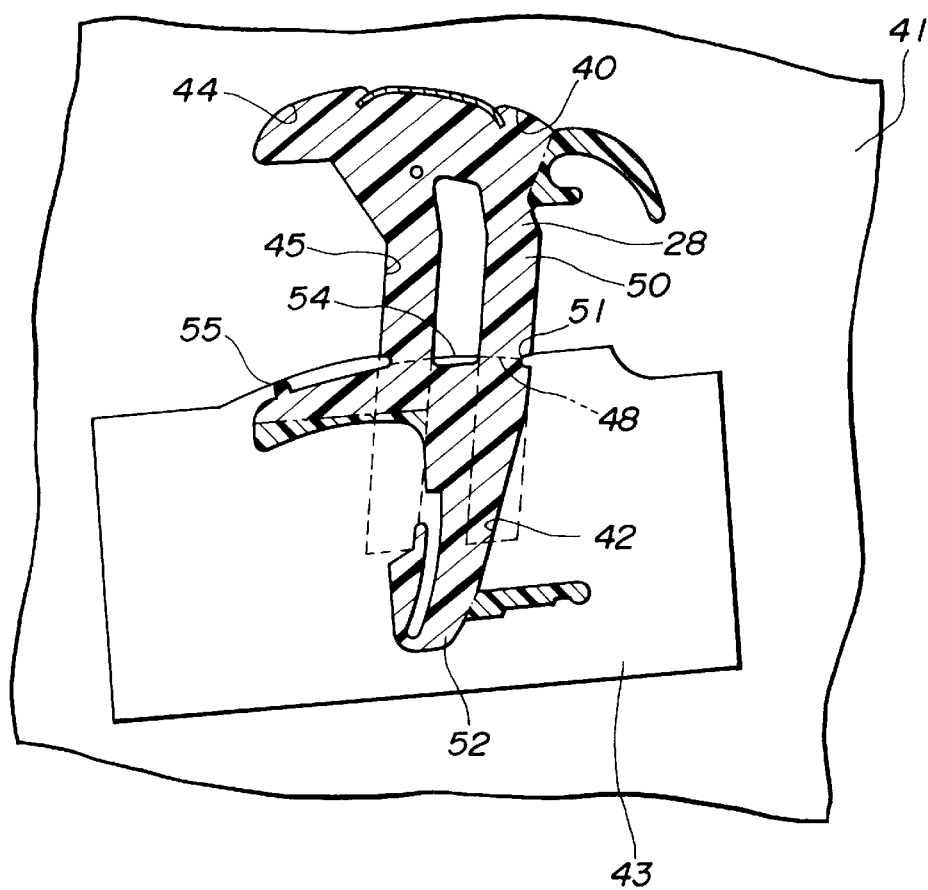
FIG. 9 is a front view which shows the extruding ports of the first and second die heads of the extrusion molding apparatus according to the present invention.
Figure 10:
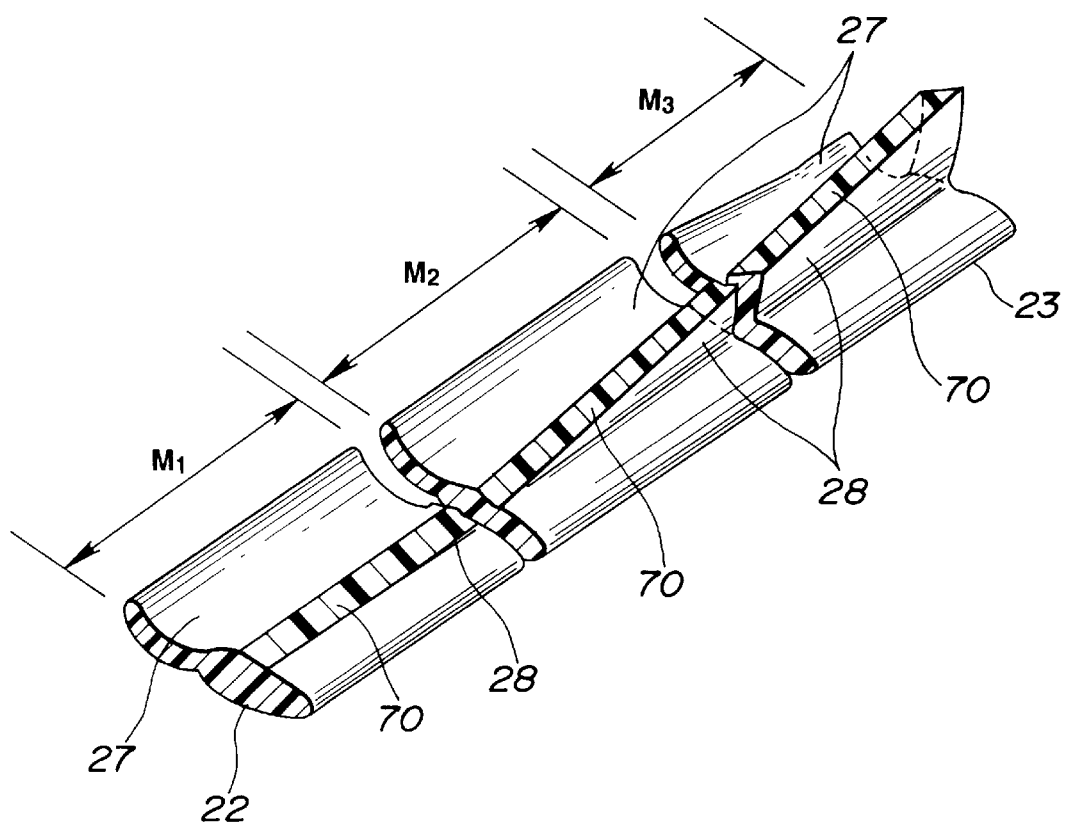
FIG. 10 is a perspective view which shows an upper portion of the window molding according to the present invention.

Following to this, in case that the side molding 23 is produced continuously with the upper molding 21, the drive cylinders 46a and 46b are operated to continuously displace the second die head 43 as shown in FIGS. 8 and 9. By this displacement of the second die head 43, the combined opening shape obtained by the combination of the main extrude opening 40 and the auxiliary extrude opening 42 is deformed. More particularly, the second die head 43 is moved downward to elongate the length of the connecting portion 45 of the first die head 41 and is inclined such that the angle between the corresponding part to the decorative head portion 27 and the corresponding part to the glass limiting lip 30 is increased. Accordingly, the length of the strut portion 28 of the first extrude molding 50 and the inclined angle of the connecting surface 70 of the lower end of the strut portion 28, which are determined according to the position and the angle of the shield plate 48, are gradually increased. FIG. 10 shows the change of the length of the strut portion 28 and the change of the inclined angle of the connecting surface 70 from the upper molding 22 to the side molding 23. As is clear from FIG. 10, at the normal portion $M_1$ of the upper molding 22 the connecting surface 70 is flat without inclination. At the interconnecting portion $M_2$ between the upper molding 22 and the side molding 23 the inclined angle of the connecting surface 70 is continuously and largely increased. At the lower portion $M_3$ which is positioned at a lower position than the interconnecting portion of the side molding 23, the inclined angle of the connecting surface 70 is gently increased. Therefore, the rainwater guide groove 37 is continuously formed from the end portion of the upper molding 22 to the lower end of the side molding 23 and is formed such that the width and the opening angle thereof are continuously increased from the upside to the downside of the side molding 23. Although a small amount of the material flows from the small width opening 55 of the second die head 55, the flowed out material is remained as a thin lip 38 on the glass limiting lip 30.

With the thus arranged production method according to the present invention, when the first and second intermediate moldings 50 and 52 are produced, the length of the strut portion 28 and the inclined angle of the connecting surface 70 of the lower end of the strut portion 28 are continuously changed by moving the second die head 43 in the vertical direction and in the rotational direction simultaneously. This enables the cross-sectional shape of the portion from the upper molding 22 to the side molding 23 to be continuously changed, more particularly, the cross-sectional shape of the rainwater guide groove 37 is easily changed into a desired shape. Therefore, the production of the window molding 21 becomes easy.

Referring to FIGS. 11 to 18, there is shown a second embodiment of the window molding, method and apparatus for producing the window molding in accordance with the present invention.

The window molding 102 made of resin material is installed at a peripheral portion of a front window glass 101 of an automotive vehicle. The window molding 102 comprises an upper molding 103 of a homogeneous cross-section which is disposed along an upper peripheral portion of the vehicle roof side of the front window glass 101 and a side molding 104 which is disposed along both side peripheral portions of the front window glass 101, a so-called a side pillar portion. The side molding 104 is formed such that the cross-section thereof is gradually increased from the upper side thereof to the lower side thereof. The upper molding 103 includes a corner molding 105 which is curved along the upper corner portion of the front window 101. The upper molding 103 and the side moldings 104 are continuously formed by means of the variable cross-section extrusion molding.

The side molding 104 is provided with a leg portion 107 located at a clearance formed between the end surface 110a of the front window glass 101 and a vehicle body panel 106, a glass limiting lip 108 projecting from the upper end of the leg portion 107 toward the upper surface side of the front window glass 101, an auxiliary lip 109 projecting from the leg portion 107 toward the opposite direction of the glass limiting lip 108, and an anchor portion 110 projecting from the lower end of the leg portion 107 toward the same direction of the glass limiting lip 108. The leg portion 107, the glass limiting lip 108 and the anchor portion 110 define a glass engaging groove 111 having a channel-shaped cross-section. The end portion of the front window glass 101 is engaged with the glass engaging groove 111.

Figure 11:
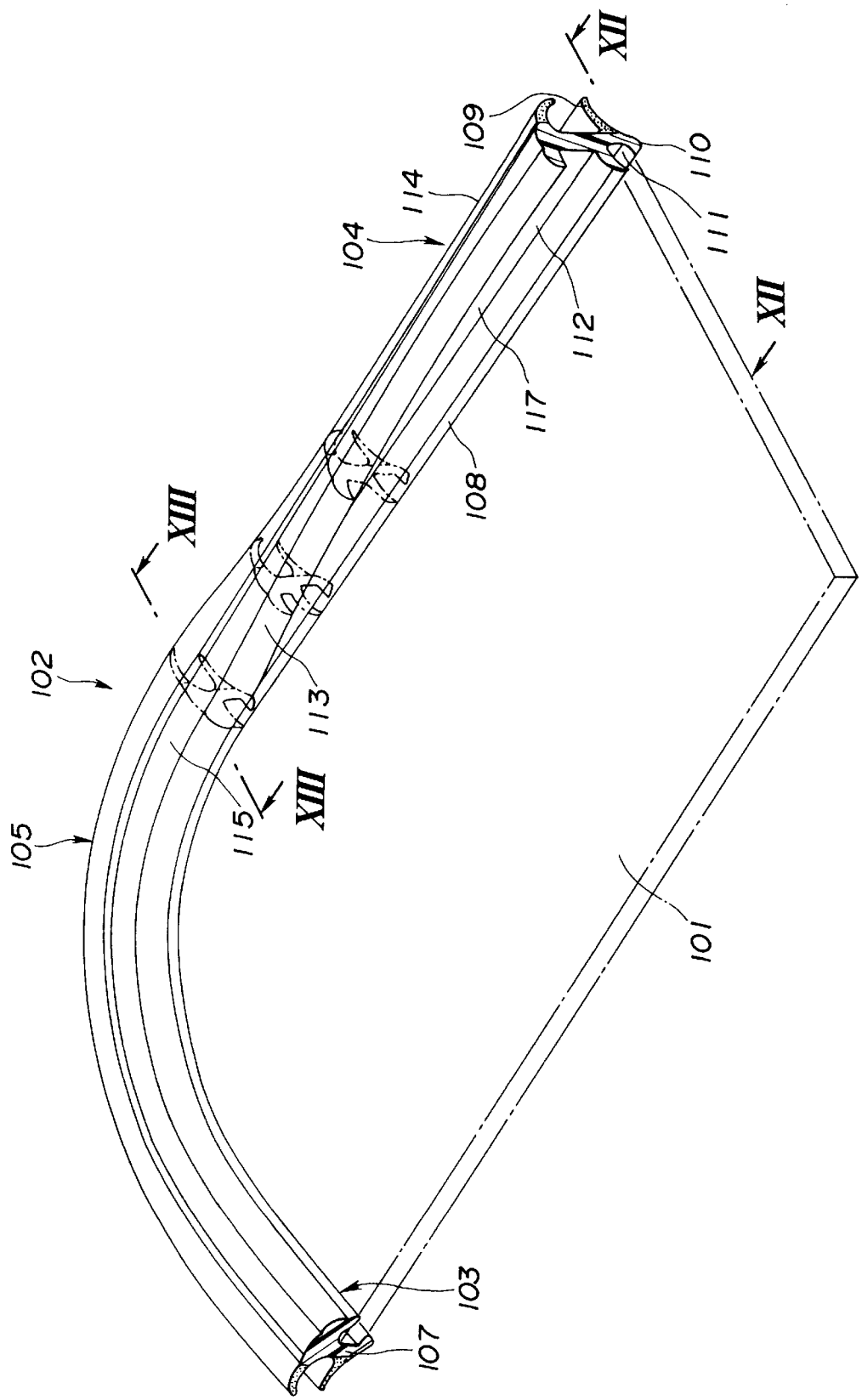
FIG. 11 is a perspective view which shows a part of the window molding of a second embodiment in accordance with the present invention.
Figure 12:
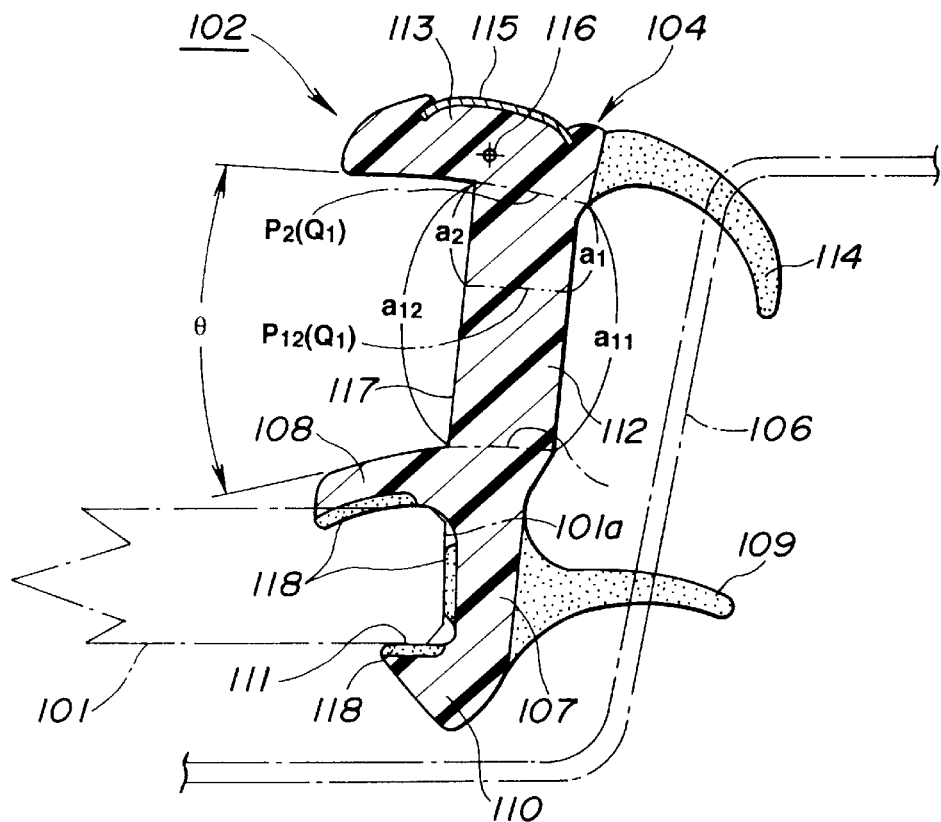
FIG. 12 is a cross-sectional view taken in the direction of XII—XII line of FIG. 11.

A head portion 113 is integrally formed at the upper end of the glass limiting lip 108 of the side molding 104 through the strut portion 112 like a lip. A panel lip 114 to be pressingly in contact with the vehicle body panel 106 is integrally projected from the head portion 113. A decorative film 115 is embedded on a center portion on the head portion 113 along the extrude direction. A core member 116 made of metal or glass fiber is embedded in the head portion 113 so as to suppress the expansion of the window molding 102 in the longitudinal direction. A rainwater guide groove 117 of a channel shaped cross-section is formed by the strut portion 112, glass limiting lip 108 and the head portion 113. The depth of the rainwater guide groove 117 and the height of the strut portion 112 are continuously and smoothly increased from the upper end to the lower end of the side molding 104. More particularly, the side molding 104 is formed such that the height of the strut portion 112 and the depth of the rainwater guide groove 117 are gradually increased form the upper end to the lower end thereof, and that the head portion 113 is twisted with respect to the glass limiting lip 108 to gradually increase the angle therebetween. Therefore, the volume of the rainwater guide groove 117 is gradually increased from the upper end to the lower end of the side molding 104, as shown in FIGS. 11 and 12. The volume of the rainwater guide groove 117 corresponds to the rainwater holding amount thereby.

It is preferable that the panel lip 114, the auxiliary lip 109 and a glass contacting portion 118 of the glass engaging groove 111 are made of soft resin material and that the leg portion 107 and the strut portion 112 are made of hard resin material.

The upper molding 103 is formed such that the glass limiting lip 108 and the head portion 113 are overlapped and integrally connected so as not to form the rainwater guide groove 117 between the glass limiting lip 108 and the head portion 113.

With the thus arranged construction of the window molding 102, the side molding 104 is arranged such that the rainwater guide groove 117 is formed between the glass limiting lip 108, the strut portion 112 and the head portion 113. Further, the volume of the rainwater guide groove 117 and the height of the strut portion 112 are gradually increased toward the lower end of the side molding 104. Therefore, the rainwater attached on the front window glass 101 is caught by the rainwater guide groove 117. This prevents the rainwater on the front window glass 101 from flowing to the side surface of the vehicle body and promotes to a smooth flow of the rainwater to lower portions through the rainwater guide groove 117.

Figure 14:
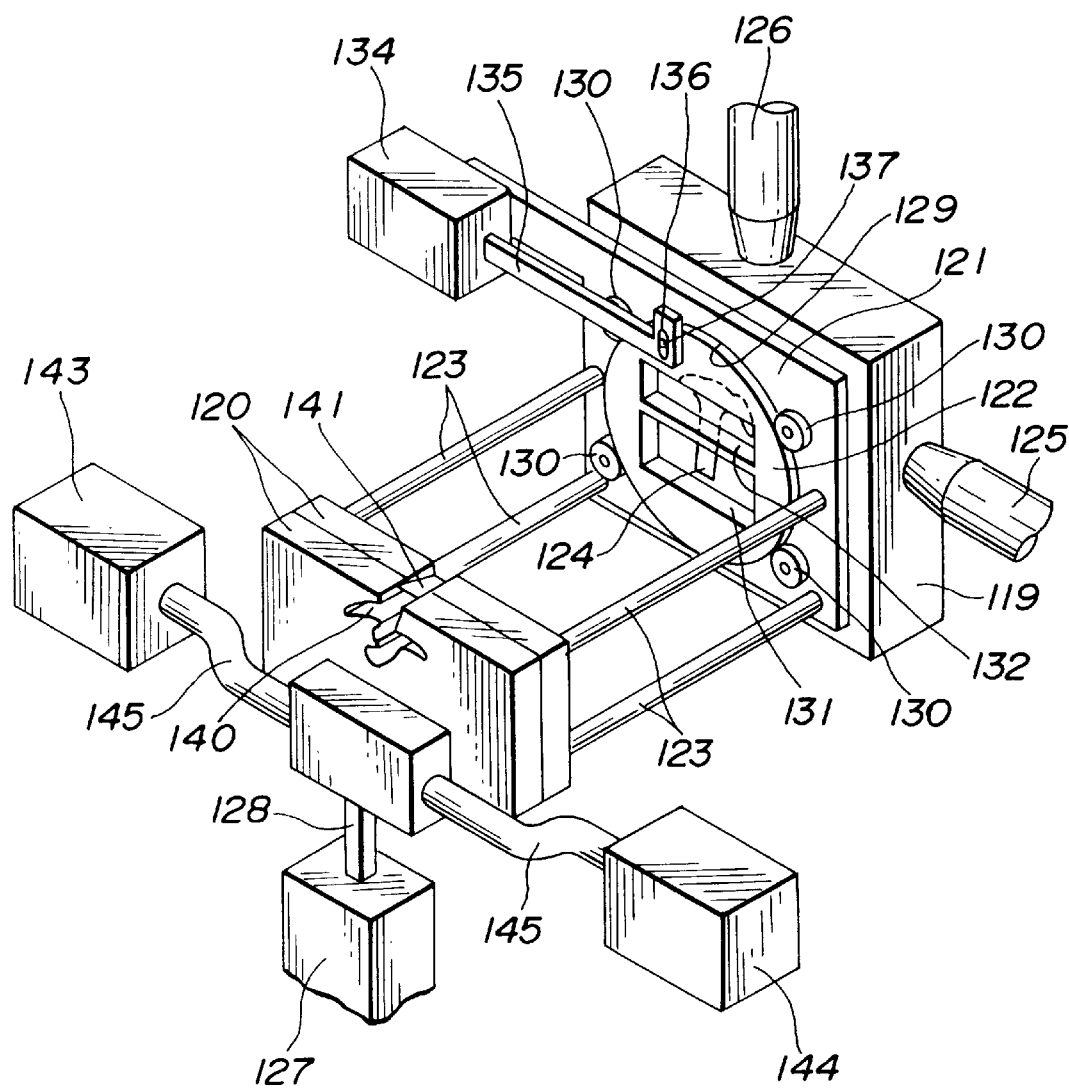
FIG. 14 is a perspective view which shows a extrusion molding apparatus for producing the window molding of the second embodiment according to the present invention.
Figure 15:
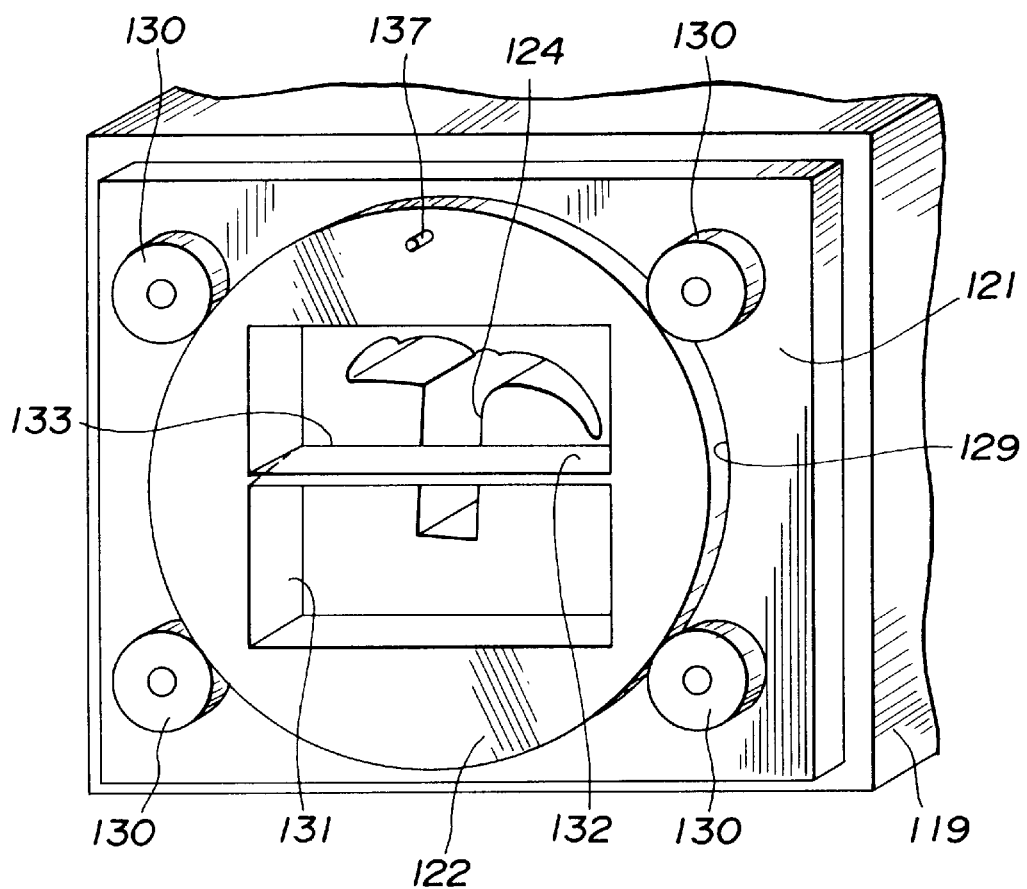
FIG. 15 is an enlarged perspective view which shows an essential portion of the extrusion molding apparatus of FIG. 14.
Figure 16:
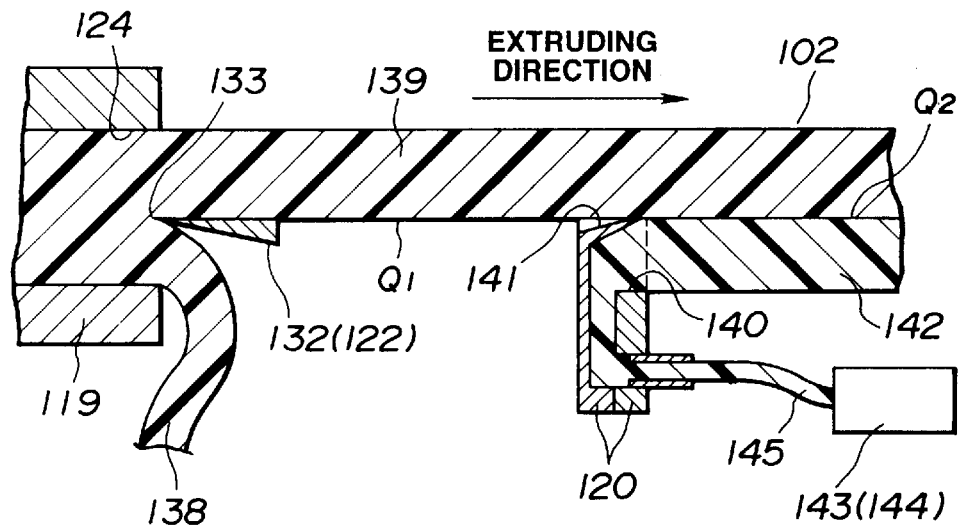
FIG. 16 is a partial cross-sectional view of the extrusion molding apparatus and the product thereby.

FIGS. 14 to 16 show the structure of the extrusion molding apparatus for producing the window molding 102 in accordance with the present invention.

A base die head 119 and a movable die head 120 are disposed to have a predetermined distance therebetween. At a front side (outlet side) of the base die head 119, a movable base 121 and a cutter 122 are disposed. The movable die head 120 is integrally interconnected with the movable base 121 through four tie-rods 123. A first extruding port 124 is formed at the base die head 119 and into a shape which includes an upper portion of the strut portion 112 and the head portion 113 and the panel lip 114. That is, the cross-sectional shape thereof corresponds to the shape of the side molding where the strut portion 112 is set highest. Two extruding machines 125 and 126 are connected to the base die head 119. One extruding machine 125 supplies hard resin material for the strut portion 112 and the like to the base die head 119. The other extruding machine 126 supplies soft resin material for the panel lip 114 to the base die head 119.

The movable base 121 disposed at an outlet side of the base die head 119 is in contact with the outlet side of the base die head 119. The movable die head 120 is interconnected to an outlet rod 128 of a direct drive type actuator 127. The movable base 121 is also interconnected with the outlet rod 128 through the movable die head 120 and the tie-rods 123. Therefore, the movable base 121 and the movable die head 120 are vertically driven with respect to the base die head 119 by the actuator 127 functioning as a slide drive means.

A supporting hole 129 of a circular shape is formed on a center portion of the movable base 121. The disc-shaped cutter 122 is engaged into the supporting hole 129 of the movable base 121. The cutter 122 is rotatably supported by the supporting hole 129 and four bearings 130 installed on the movable base 121. The cutter 122 is fittingly in contact with the outlet surface of the base die head 119. The cutter has a rectangular window portion 131 at its center portion such that the first extrude portion 124 is faced with the external portion through the window portion 131. A cutter blade having a wedge shaped cross section is traversely installed at the center portion of the window portion 131. The tip end of the cutting bade 133 of the cutter 122 is located at the outlet side of the base die head 119 fittingly or adjacently.

A direct drive type actuator 134 functioning as a cutter drive means is installed at the movable base 121. An output rod 135 of this actuator 134 is interconnected with the cutter 122 through a slot 136 and a pin 137. Therefore, the cutter 122 is rotatable on a plane surface perpendicular to the molding extruding direction according to the operation of the actuator 134. That is, the cutter 122 is vertically movable with the movable base 121 and the movable die head 120 and is simultaneously rotatable with respect to the movable base 121.

Accordingly, by extruding the predetermined resin material from the first extrude port 124 under the condition that the position of the cutter 122 is held such that the cutter blade 132 is located at the lowest position Pi with respect to the base die head 119, and by continuously raising the cutter 122 from the lowest position $P_1$ to the highest position $P_2$ shown in FIG. 12 at a predetermined speed, the part of the strut portion 112 just after the start of the extrusion is cut off as a conditioning material, and the strut portion 112, the head portion 112 and the panel lip 114 of the side molding 104 is extruded as a first intermediate molding 139 where the height of the strut portion 112 is gradually changed. Of course, even if the lo cutter blade 132 is continuously lowered from the highest position $P_2$ to the lowest position $P_1$, the same first intermediate molding 139 is extruded by this molding process.

In reverse, by extruding the predetermined resin material from the first extruding port 123 under a condition that the position of the cutter 122 is held such that the cutter blade 132 is located at the highest position $P_2$ with respect to the base die head 119, almost all of the strut portion 112 just after the start of the extrusion is cut off, and the upper molding 103 having the head portion 113 and the panel lip 114 without the strut portion 112 is extruded as the first intermediate molding 139.

The movable die head 120 is interconnected with and supported to the output rod 128 of the actuator 127. An extruding portion having a shape corresponding to a common part between the upper molding 103 and the side molding 104 is formed on the movable die head 120. More particularly, a second extruding port 140 is formed to include the leg portion 107, the glass limiting lip 108, the anchor portion 110 and the auxiliary lip 109. A part of the second extruding port 140 is upwardly opened and an inclined guide groove 141 is formed at the opening portion continuously.

Accordingly, by extruding the predetermined resin material from the second extruding port 140, a second intermediate molding 142 which is formed to include a part of the leg portion common between the upper molding 103 and the side molding 104, the glass limiting lip 108, the anchor portion 110, the auxiliary lip 109 is extruded.

As is similar to the base die head 119, two extruding machines 143 and 144 are connected to the movable die head 120 through flexible pipes 145. One extruding machine 143 supplies the hard resin material for the leg portion 107 and the like to the movable die head 120. The other extruding machine 144 supplies the soft resin material for the auxiliary lip 109 and the like to the movable die head 120.

In case that the molding of the window molding 102 is executed by means of the above-mentioned extruding mold apparatus, the core wire 116 and the decorative film 115 are inserted into the first extruding port 124 of the base die head 119 and are drawn at a predetermined speed. Further, synchronizing with the feeding operation of the core wire 116 and the decorative film 115, the hard and soft resin materials are extruded through the first extruding port 124 to form the first intermediate molding 139. From the second extruding port 140 of the movable die head 120, the hard and soft materials are extruded to mold the second intermediate molding 143. The first intermediate molding 139 is overlapped on the second intermediate molding 142 molded by the movable die head 120, and they are integrally connected to mold the window molding 102.

More particularly, the shape of the first extruding port 124 of the base die head 119 corresponds to the shape which includes the highest strut portion 112, the head portion 113 and the panel lip 114. The first intermediate molding 139 corresponding to the shape of the first extruding port 124 is extruded from the first extruding port 124, and its lower part is cut by the cutter 122 disposed adjacent to the first extruding port 124 as determining material. Therefore, the upper part of the first intermediate molding 139 located higher that the cutter 122 is fed to the movable die head 120.

By setting the cutter blade 132 at the highest position $P_2$ with respect to the base die head 119, the part corresponding to the strut portion 112 is cut off from the first intermediate molding 139 extruded from the first extruding port 124, and the head portion 113 and the panel lip 114 are remained as the first intermediate molding 139. As a result, as far as the cutter is set at the highest position $P_2$, the first intermediate molding 139 including the head portion 113 and the panel lip 114 but not including the strut portion 112 is continuously extruded.

Further, when the movable base 121 is lowered at a predetermined speed together with the movable die head 120 by operating the actuator 127 synchronously with the extruding operation of the first intermediate molding 139, the amount of the waste material 138 cut off by the cutter 122 is gradually decreased. As a result, the strut portion 112 is added to the first intermediate molding 139 and the height of the strut portion 122 becomes gradually large. Therefore, the side molding 104 where the height of the strut portion 122 is gradually changed is continuously molded by means of the extrusion molding.

At this time, synchronizing with the lowering of the cutter 122, the cutter 122 is gradually rotated in the anti-clockwise direction of FIGS. 14 and 15 by the operation of the actuator 127. By this rotational operation, the inclination of the cut surface $Q_1$ of the strut portion 112 is changed. That is, as shown in FIG. 12, during the process that the cut surface $Q_1$ located at the position $P_2$ is continuously changed through the position $P_{12}$ to the position $P_1$, the dimension $a_2$ is greater than the dimension $a_1$, and the dimension $a_{12}$ becomes greater than the dimension $a_{11}$. Further, the relationship $(a_2/a_1)<(a_{12}<a_{11})$ is established. As a result, the angle θ between the heat portion 113 and the glass limiting lip 108 obtained by connecting the first intermediate molding 139 with the second intermediate molding 142 through the cut surface $Q_1$ is gradually increased.

The first intermediate molding 139 (inclding a cut surface $Q_1$) cut by the cutter 122 as mentioned above is fed on the movable die head 120 while being guided by the guide groove 141. Further, the second intermediate molding 142 having the shape which is of a common part between the upper molding 103 and the side molding 104 is extruded by means of the extrusion molding. The second intermediate molding 142 includes the leg portion 107, the glass limiting lip 108, the anchor portion 110 and the auxiliary lip 109. The first and second intermediate moldings 139 and 142 are overlapped and integrally connected through the cut surface $Q_1$ (connecting surface $Q_2$). This enables the window mold 102 having a changing cross section in the longitudinal direction to be continuously molded.

Since the cut surface $Q_1$ of the first intermediate molding 139 is slidingly in contact with the guide groove 141, the attitude of the first intermediate molding 139 is controlled. Therefore, the first intermediate molding 139 is fitted with the second intermediate molding 142 through the cut surface $Q_1$ while being bent according to the inclination of the cut surface $Q_1$. The side molding 104 is arranged such that the angle θ is continuously changed.

Figure 13:
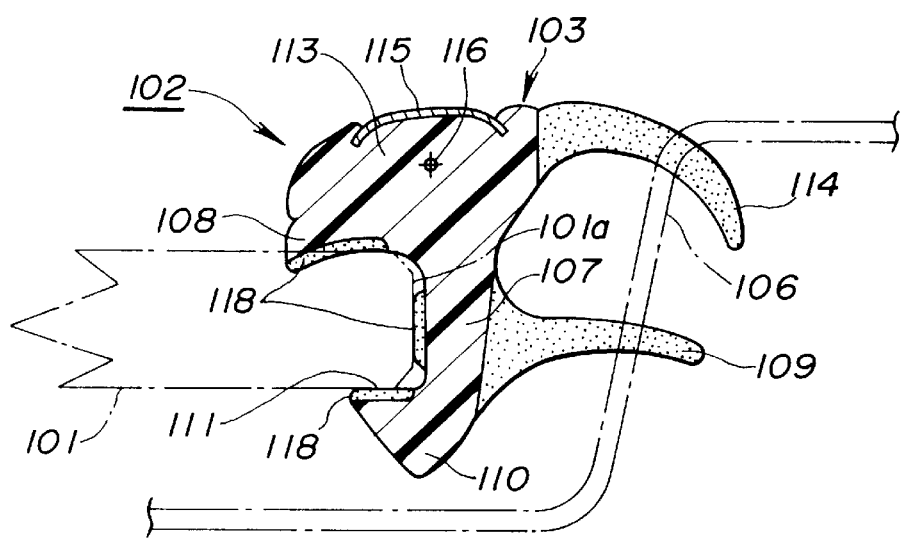
FIG. 13 is a cross-sectional view taken in the direction of XIII—XIII line of FIG. 11.

Since the upper molding 103 does not include the strut portion 112, it is formed to have a cross sectional shape shown in FIG. 13 where the head portion 112 is directly in contact with the glass limiting lip 108. On the other hand, the side mold 104 is formed such that the strut portion 112 of the first intermediate molding 139 is connected with the leg portion 107 of the second intermediate molding 142 as shown in FIG. 12.

With the thus arranged second embodiment, by rotating the cutter 122 by a predetermined amount independently while vertically moving the cutter 122 with the movable die head 120 synchronously with the extruding operation from the extruding ports 124 and 140 of the base die head 119 and the movable die head 120, the upper molding 103 having the homogenous cross sectional shape where the head portion 113 and the glass limiting lip 108 is fitted without the strut portion 112 and the side molding 104 where the height of the strut portion 112 is continuously changed are integrally and continuously extruded to form the window molding 102.

Figure 17:
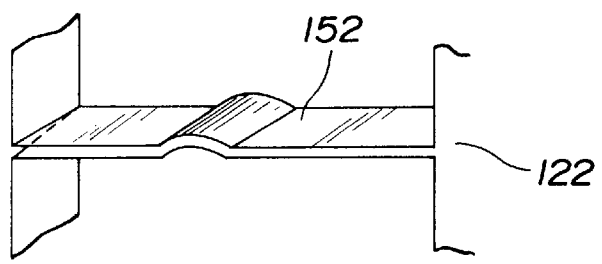
FIG. 17 is a perspective view which shows a modification of a cutter of the extrusion molding apparatus.
Figure 18:
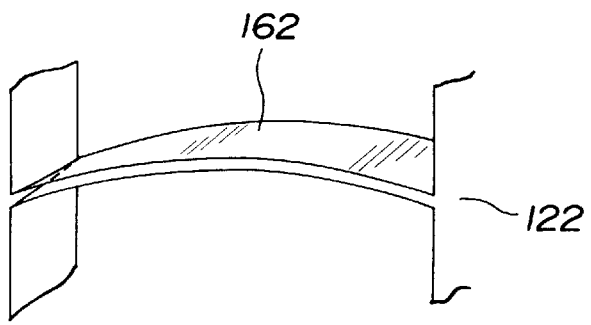
FIG. 18 is a perspective view which shows a modification of another cutter of the extrusion molding apparatus.

Although the second embodiment of the present invention has been shown and described such that shape of the cutter blade 132 of the cutter 122 is formed straight as shown in FIG. 15, the shape of the cutter blade 132 is not limited to this and may be formed into arc shape partially or wholly as shown by the reference numerals 152 and 162 in FIGS. 17 and 18.

Referring to FIGS. 19 to 25, there is shown a third embodiment of the window mold, method and apparatus for producing the same in accordance with the present invention.

The window molding 102 produced by the apparatus of the third embodiment according to the present invention is the same as that of the second embodiment. Therefore, the explanation of the window molding 102 will be omitted herein.

Figure 21:
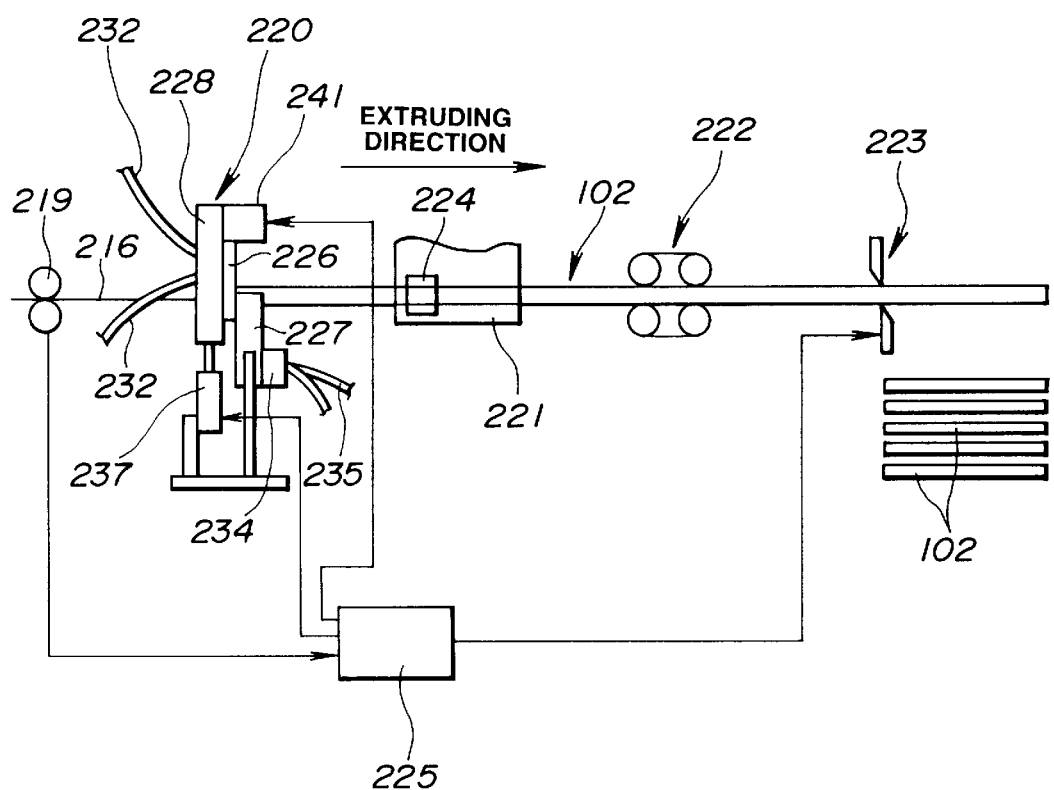
FIG. 21 is a schematic view of a production line for producing the window molding of the third embodiment.

FIG. 21 shows a production line for producing the window molding 102 by means of the extrusion molding. A core wire 116 is continuously inserted into an extruding die head 220 while being measured by a length measuring device (rotary encoder) 219. The window molding 102 is extruded by means of a variable cross-section extrusion method while the core wire 116 is used as a base material. The extruded window molding 102 passes through a cooling bath 221 and is drawn by a drawing machine 222. Then, the continuous window molding 102 is cut into a predetermined length adapted to a front window glass of the automotive vehicle by means of a cutting machine 223. The cutting machine 223 is controlled by a control unit 225 upon receiving information signal indicative of the length of the core wire 116 from the measuring device 219. A sizing jig 224 is installed at an inlet portion of the cooling bath 221. Therefore, the window molding 102 just after the extrusion molding passes on the sizing jig 224.

Figure 22:
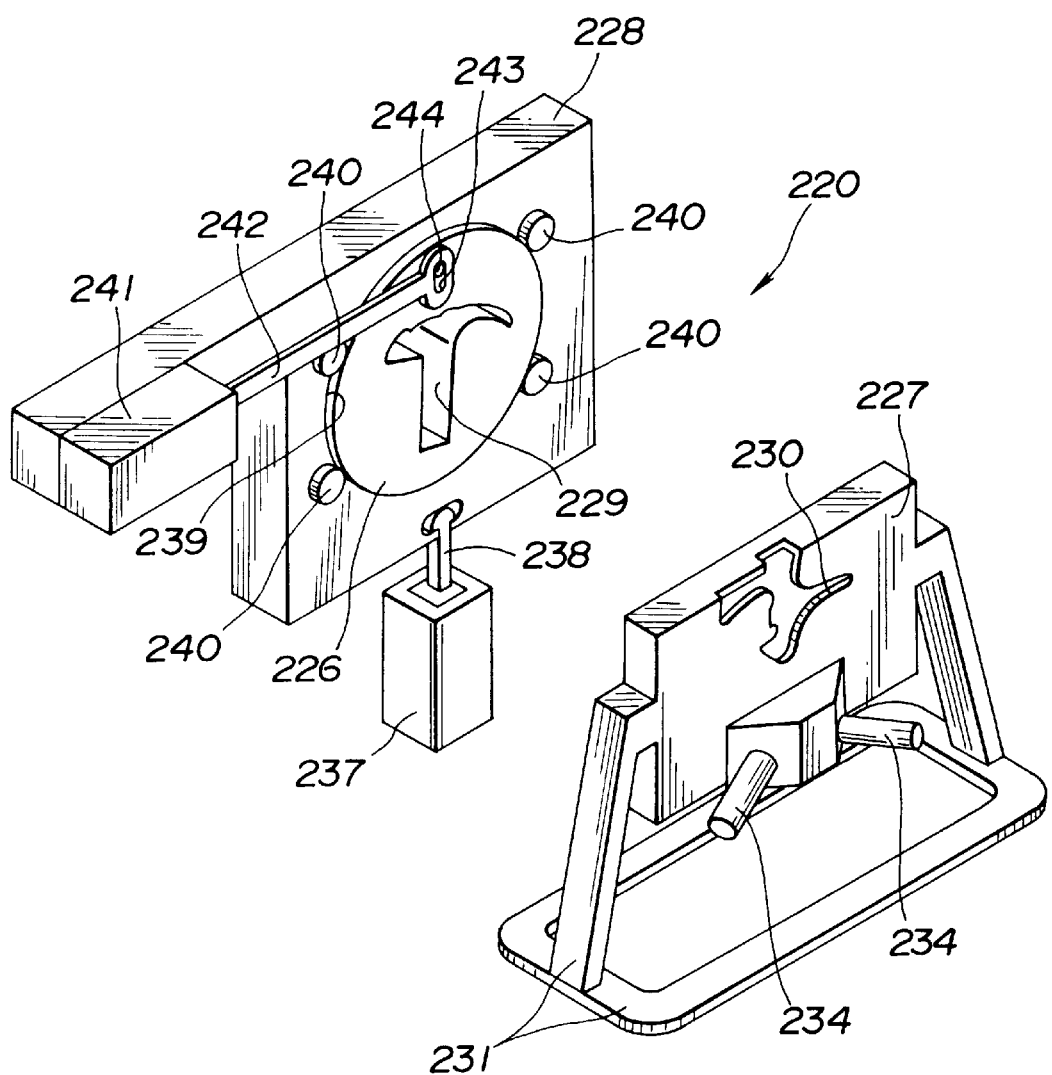
FIG. 22 is an exploded perspective view which shows the extrusion die heads of the third embodiment.
Figure 23:
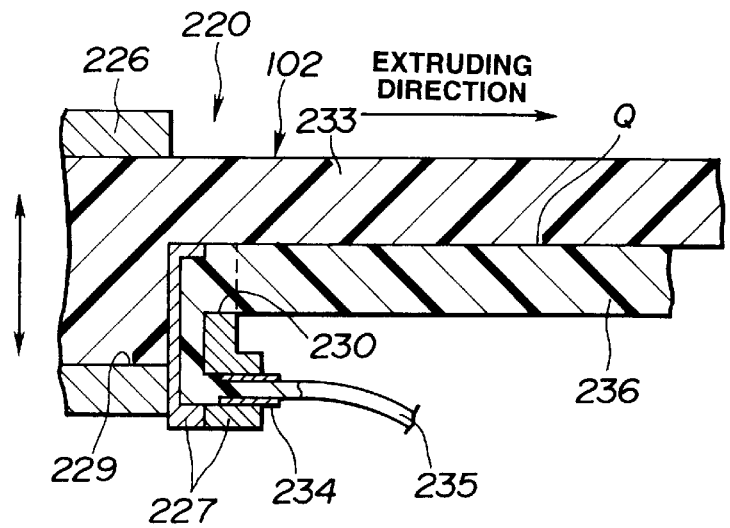
FIG. 23 is a cross sectional view the extrusion molding apparatus and the product thereby of the third embodiment.

As shown in FIGS. 21, 22 and 23, the extruding die head 220 is constituted by a movable die head 226, a fixed die head 227 which is fittingly disposed at a front surface of the movable die head 226 to function as a shield plate, and a movable base 228 supporting the movable die head 226. The movable die head 226 has a first extruding port 229, and the fixed die head 227 has a second extruding port 230. The fixed die head 227 is integrally formed with a frame 231 through which the fixed die head 227 is fixed to a not-shown base. The first extruding port 229 is formed to have a shape which includes the strut portion 112 upper than the glass limiting lip 108 of the side molding 104, the head portion 113 and the panel lip 114. That is, the shape of the first extruding port 229 corresponds to a cross section of the side molding 104 having the highest strut portion 112. On the other hand, the shape of the second extruding port 230 is a shape common between the side molding 104 and the upper molding 103. That is, the second extruding port 230 is formed into a shape including the leg portion 107, the glass limiting lip 108, the anchor portion 110 and the auxiliary lip 109.

Since the fixed die head 227 is overlapped on the movable die head 226 so as to close the part of the first extruding port 229 of the movable die head 226, the window molding 102 having a cross sectional shape obtained by combining the first and second extruding ports 229 and 230.

A pair of flexible hoses 232 and 232 are connected to the movable die head 226 and supply the hard resin material for the strut portion 112 and the like and the soft resin material for the panel lip 114 and the like respectively from not-shown extruders to the movable die head 226. As shown in FIG. 23, a first intermediate molding 233 is formed by the first extruding port 229 of the movable die head 226 partially covered with the fixed die head 227 and is extruded to the front side of the movable die head 226 on the fixed die head 227.

A pair of flexible hoses 235 and 235 are connected to material supply ports 234 and 234 of the fixed die head 227 and supply the hard resin material for the leg portion 107 and the like and the soft resin material for the auxiliary lip 109 and the like from not-shown extruders to the fixed die head 227, respectively. A second intermediate molding 236 having a cross sectional shape corresponding to the shape of the second extruding port is extruded and overlapped with the first intermediate molding 233. The first and second intermediate moldings 233 and 236 are momentarily connected with each other and are uniformed.

The movable base 28 is arranged to support the movable die head 226 and to be interconnected with an output rod 238 of a direct drive type actuator 237 functioning as a sliding drive means. Therefore, the movable base 228 is vertically driven together with the movable die head 226 with respect to the fixed die head 227. A supporting hole 239 of a circular shape is formed on a center portion of the movable base 228.

The disc-shaped movable die head 226 is engaged into the supporting hole 239 of the movable base 228. The movable die head 226 is rotatably supported by the supporting hole 239 and four bearings 130 installed on the movable base 228. The movable die head 226 is fittingly in contact with the outlet surface of the movable base 228. A direct drive type actuator 241 is installed to the movable base 228 as a rotation drive means for rotating the movable die head 226. An output rod 242 of the actuator 241 is interconnected with the movable die head 226 through a slot 243 and a pin 244. Therefore, the movable die head 226 is arranged to be rotated on a plane perpendicular to the mold extruding direction according to the expanding and/or compressing operation of the actuator 241. That is, the movable die head 226 is vertically movable together with the movable base 228 and is independently rotatable with respect to the fixed die head 227.

Figure 19:
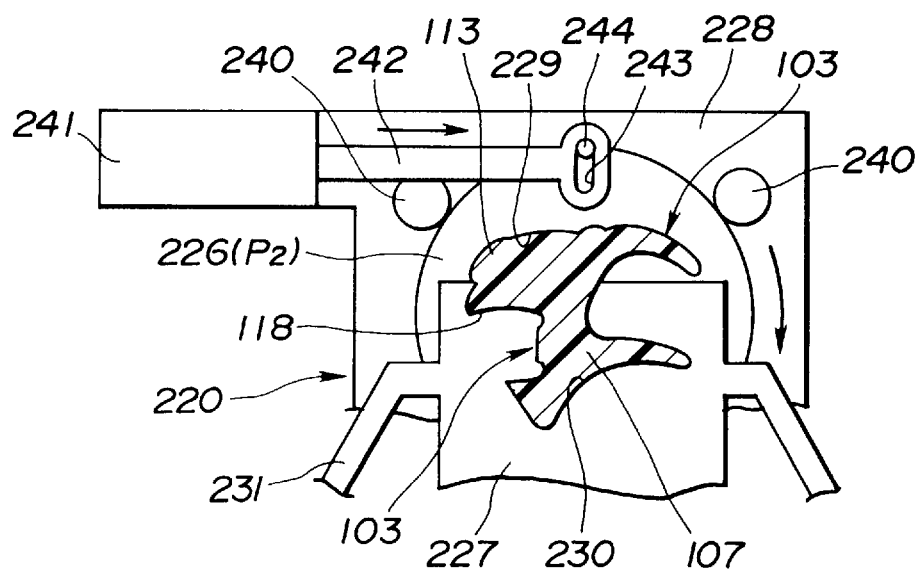
FIG. 19 is a front view of the extrusion molding apparatus of a third embodiment according to the present invention.
Figure 20:
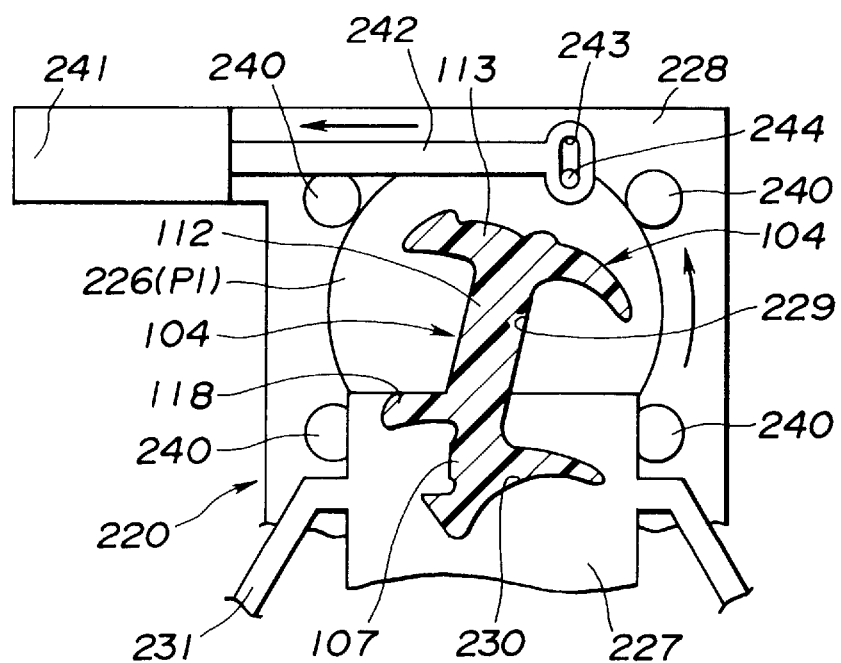
FIG. 20 is a front view of the extrusion molding apparatus which is set to mold a side molding.

As shown in FIG. 20, by extruding the predetermined resin material from the first and second extruding ports 229 and 230 under a condition that the movable die head 226 is set at the highest position $P_H$ with respect to the fixed die head 227 and by continuously lowering the movable die head 226 from the highest position $P_H$ to the lowest position $P_L$ shown in FIG. 19 at a predetermined speed, the side molding 104, in which the height of the strut portion 112 is gradually changed, is extruded.

It will be understood that the movable die head 226 may be continuously raised up from the lowest position $P_L$ to the highest position $P_H$ with respect to the fixed die head 227 to obtain the side molding 104 similarly.

In reverse, by extruding the predetermined resin material from the first and second extruding ports 229 and 230 under a condition that the movable die head 226 is held at the lowest position $P_L$ with respect to the fixed die head 227, the upper molding having no strut portion 112 is molded by the extrusion molding.

According to the method for producing the window molding 102 of the third embodiment, the core wire 116 and the decorative film 115 are inserted into the first extruding port 229 of the movable die head 226 and are drawn at a predetermined speed. Further, the first intermediate molding 233 is molded by extruding the hard and soft resin materials from the first extruding port 229 synchronously with the feeding operation of the core wire 116 and the decorative file 215, and the second intermediate molding 236 is molded by extruding the hard and soft resin materials from the second extruding port 230 of the fixed die head 227. The first intermediate molding 233 is overlapped on the second intermediate molding 236 molded by the fixed die head 227 and is united therewith to form the window molding 102.

When the movable die head 226 is held at the lowest position PL as shown in FIG. 19, the lower half portion of the first extruding port 229 of the movable 226 is closed by the fixed die head 227. Therefore, the first intermediate molding 233 including the head portion 213 and the panel lip 214 is extruded from the first extruding port 229. As a result, as far as the movable die head 226 is held, the first intermediate molding 233 which does not include the strut portion 12 is continuously extruded.

On the other hand, the second intermediate molding 236 has a cross section common between the upper molding 103 and the side molding 104, that is, the cross sectional shape thereof includes the leg portion 107, the glass limiting lip 108, the anchor portion 110 and the auxiliary lip 109. This second intermediate molding 236 is extruded from the second extruding port 230 of the fixed die head 227. The first and second intermediate moldings 233 and 236 are integrally connected at the connecting surface $Q_3$. Although the first extruding port 229 is slightly offset from the second extruding port 230 in the extruding direction, the first intermediate molding 233 is quickly connected with the second intermediate molding 236 and uniformed therewith. Only when the movable die head 226 is located at the lowest position $P_L$ shown in FIG. 19, the upper molding 103 having a homogeneous shape is continuously molded.

In contrast, when the movable die head 226 is continuously raised up at a predetermined speed from the lowest position $P_L$ to the highest position $P_H$ by the operation of the actuator 237 synchronously with the extruding operation of the first and second intermediate moldings 233 and 236, the strut portion 112 is added to the first intermediate molding 233, and the height length of the strut portion 233 is gradually increased. Therefore, the side molding 104, in which the height length of the strut portion 112 is continuously changed, is extruded.

At this time, the movable die head 226 is gradually rotated in the clockwise direction in FIGS. 19, 20 and 22 by operating the actuator 241, synchronously with the operation that the movable die head 26 is raised up at a predetermined speed together with the movable base 228 by the operation of the actuator 237. By this rotational operation, the angle θ between the head portion 113 and the glass limiting lip 108 shown in FIG. 12 is gradually increased simultaneously with the increase of the height length of the strut portion 112.

That is to say, since the upper molding 103 does not include the strut portion 112, it is formed to have a cross sectional shape shown in FIG. 13 where the head portion 112 is directly in contact with the glass limiting lip 108. On the other hand, the side molding 104 is formed such that the strut portion 112 of the first intermediate molding 233 is connected with the leg portion 107 of the second intermediate molding 236.

By independently rotating the movable die head 226 while vertically moving the movable die head 226 together with the movable base 228, synchronously with the extruding operation at the first and second extruding ports 229 and 230 of the movable die head 226 and the fixed die head 227, the upper molding 103 of a homogenous shape which does not include the strut portion 112 and includes the head portion 113 and the glass limiting lip 108 and the side molding 104 where the height of the strut portion 112 is continuously changed are continuously extruded.

Furthermore, since the second intermediate molding 236 having a shape common between the upper molding 103 and the side molding 104 is molded by the fixed die head 227 of the position fixed type, the attitude of the leg portion 107, the glass limiting lip 108 and the auxiliary lip 109 are constantly formed regardless the upper molding 103 or the side molding 104. Further, with respect to the leg portion 107 having a constant attitude, the head portion 113, the strut portion 112 and the panel lip 114 are respectively twisted with a predetermined angle at the respective upper molding 103 and the side molding 104.

Figure 24:
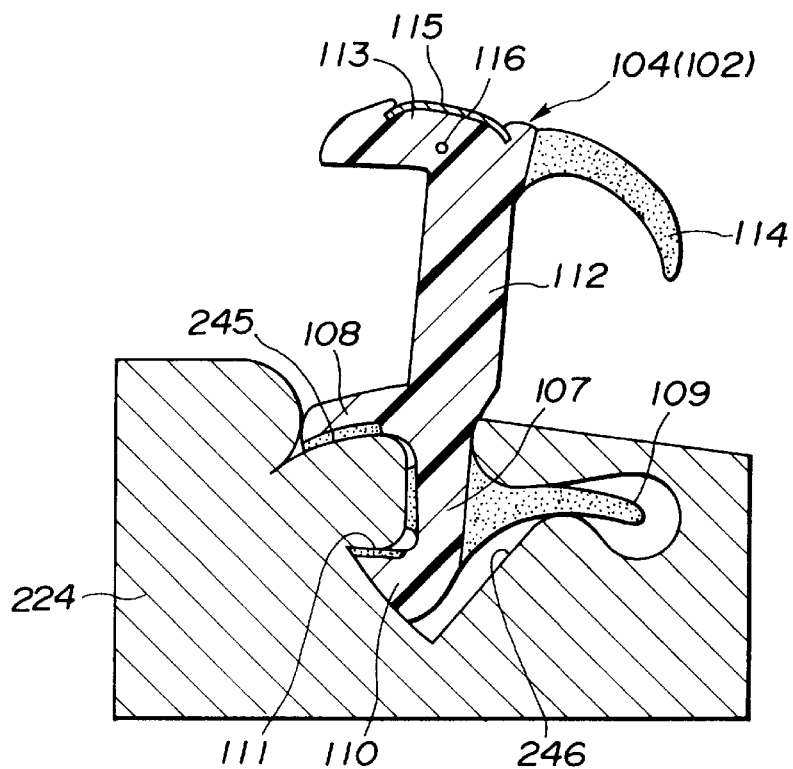
FIG. 24 is a cross sectional view of the side molding sliding on a sizing jig of the third embodiment.
Figure 25:
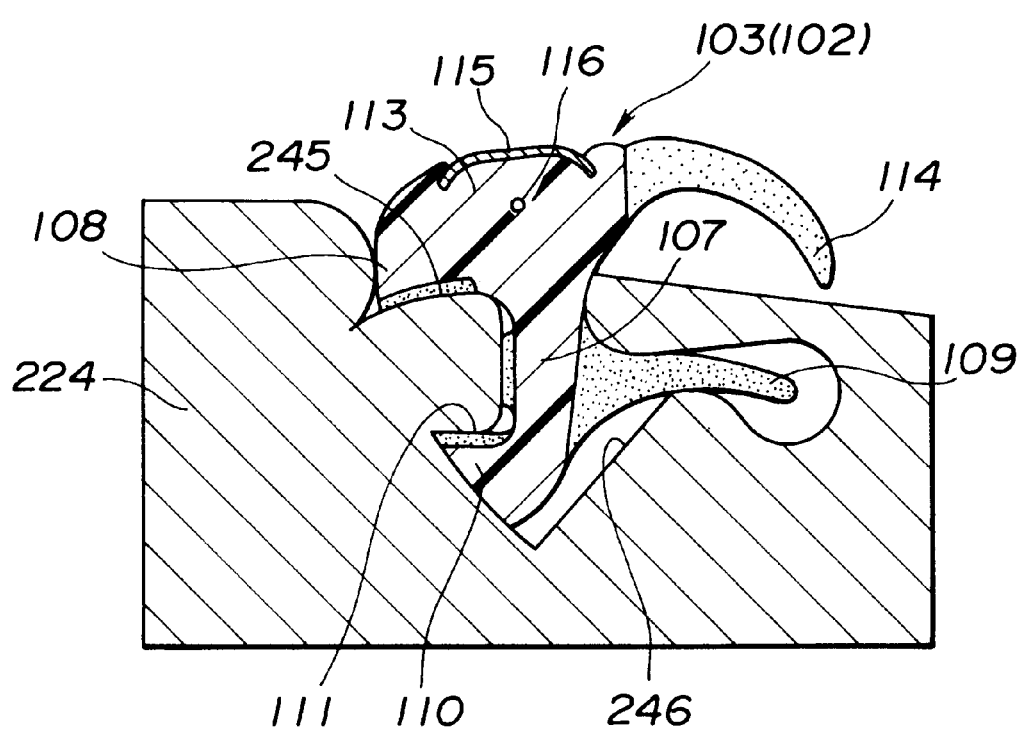
FIG. 25 is a cross sectional view of an upper molding sliding on the sizing jig of the third embodiment.
Figure 26:
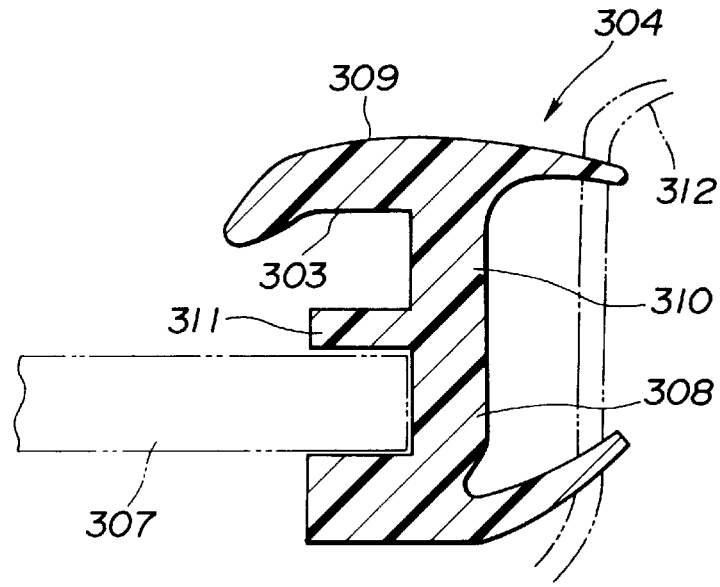
FIG. 26 is a cross sectional view of a side molding of a conventional window molding.
Figure 27:
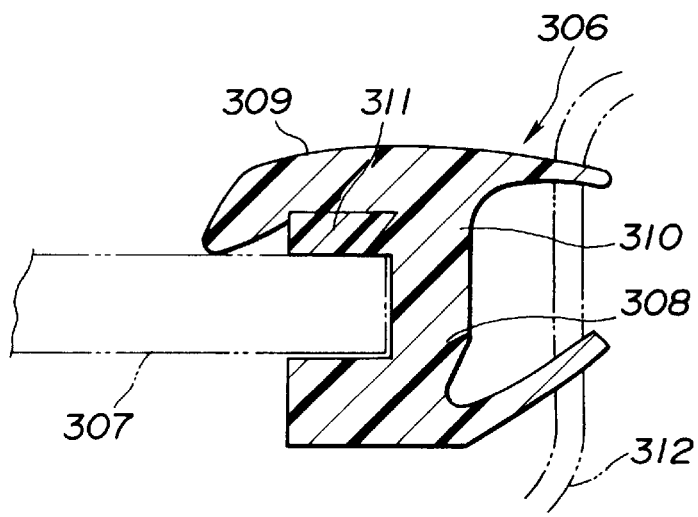
FIG. 27 is a cross sectional view of an upper molding of the conventional window molding.
Figure 28:
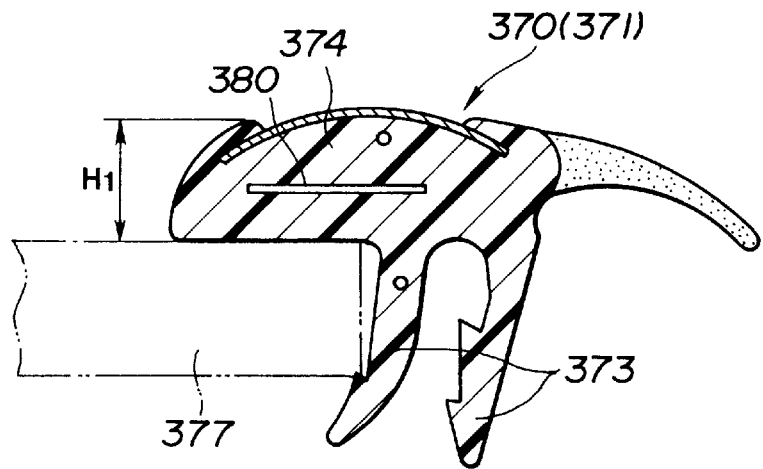
FIG. 28 is a cross sectional view of a side molding of another conventional window molding.
Figure 29:
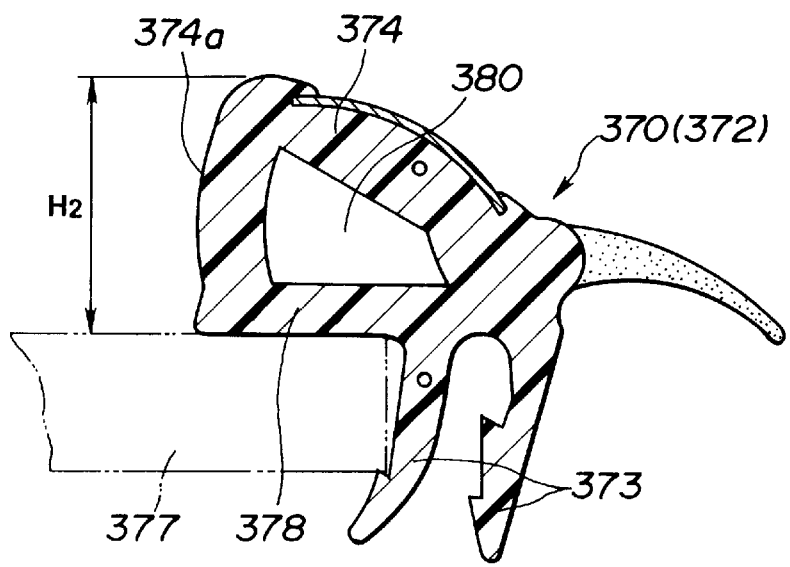
FIG. 29 is a cross sectional view of an upper molding of the conventional window molding.
Figure 30:
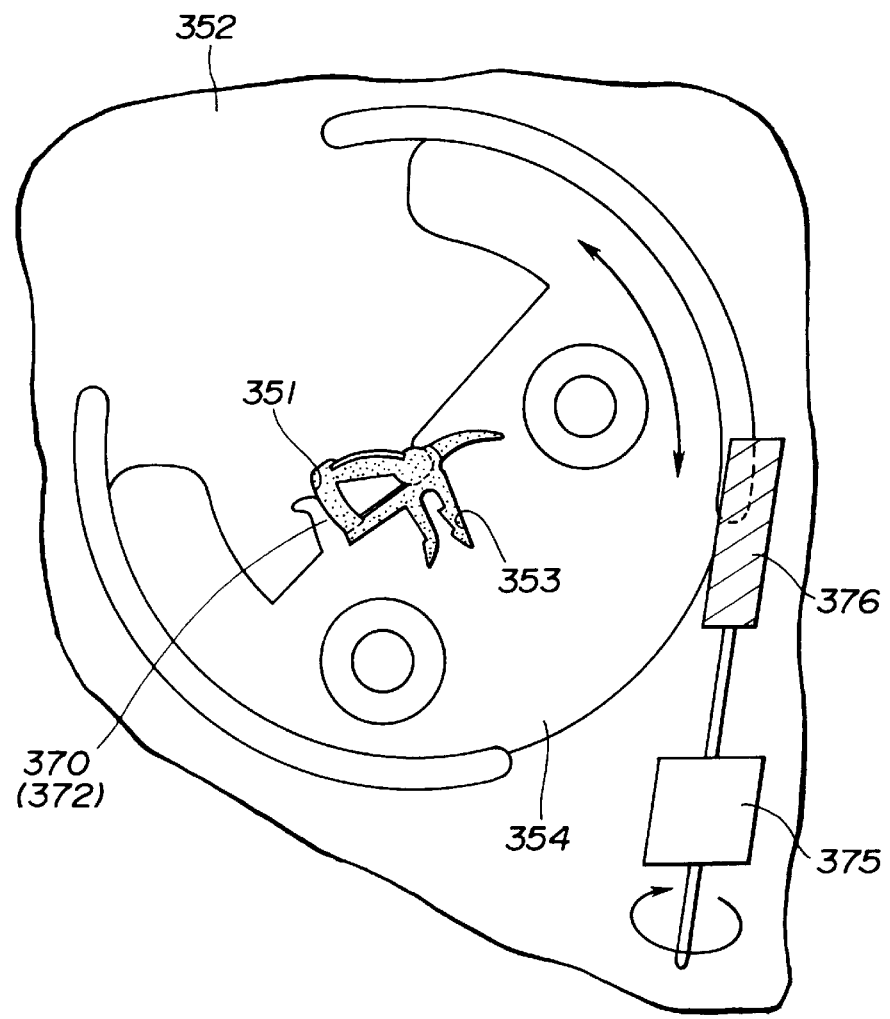
FIG. 30 is front view of a conventional extrusion molding apparatus having a fixed upper part die head and a rotatable lower part die head for the window molding of FIGS. 28 and 29.

The window molding 102 extruded from the extruding die head 220 is fed to the cooling bath 221 as shown in FIG. 21. The fed window molding 102 passes on the sizing jig 224 installed at the inlet portion of the cooling bath 221. As shown in FIGS. 24 and 25, the sizing jig 224 has a guide standard surface 245 in contact with the glass limiting lip 108 and a guide groove 246 for guiding the anchor portion 110, the auxiliary lip 109 and the leg portion 107. The sizing jig 224 is formed into a block shape having a predetermined length in the longitudinal direction of the window molding 102. The sizing jig 224 particularly functions to accurately mold the position and the shape of the glass engaging groove 111 which requires high-accuracy dimension.

Even if the window molding 102 just after the molding passes on the sizing jig 224, the window molding 102 has the leg portion 107 and the glass limiting lip 108 which are formed with a constant attitude without a conventional twist regardless the upper molding 103 or the side molding 104. Therefore, the upper molding 103 and the side molding 104 smoothly pass the sizing jig 224 without generating the twisting force at the inlet side of the sizing jig 224.

With the thus arranged embodiments according to the present invention, the side molding 23, 104 of the window molding 21, 102 is formed such that the height length of the strut portion 28, 112 and the angle between the head portion and the glass limiting lip are gradually increased from the end connected to the upper molding 22, 103. Therefore, the volume of the rainwater guide groove is largely increased without increasing the projecting amount of the head portion with respect to the front pillar. Further, it becomes possible to produce the window molding 21, 102 with a high accuracy in dimension without generating the deformation thereof. Furthermore, since the window molding 21, 102 is molded while keeping a constant attitude regardless the upper molding and the side molding, no twisting force is applied to the leg portion and the glass limiting lip even if the window molding passes through the sizing jig just after the molding. This improves the dimensional accuracy and the molding stability in the position and the shape of the leg portion and the glass limiting lip. Therefore, the assembling ability of this window molding according to the present invention is further improved.

What is claimed is:

1. A window molding installed between a front window glass and a vehicle body, comprising:
   an upper molding including:
      a leg portion of the upper molding disposed between a periphery of the front window glass and a window frame of the vehicle body,
      a glass limiting lip of the upper molding projecting from the leg portion of the upper molding and contacting an outer board surface of the periphery of the front window glass; and
      a head portion of the upper molding connected to the leg portion and the glass limiting lip of the upper molding; and
   a side molding continuous with said upper molding, said side molding including:
      a leg portion and a glass limiting lip of the side molding, wherein each is the same as the respective parts of said upper molding,
      a strut portion connected to the leg portion of the side molding; and
      a head portion of the side molding connected to the strut portion of the side molding,
   wherein an angle of the strut portion with respect to the glass limiting lip of the side molding is varied while a length of the strut portion is increased so that an angle between the head portion and the glass limiting lip of the side molding is gradually increased from an end of said side molding connected to said upper molding to the other end,
   wherein the shapes of the glass limiting lip and the head portion of the upper molding and the glass limiting lip and the head portion of the side molding are the same, wherein the angle between the glass limiting lip and the head portion of the upper molding is different from the angle between the glass limiting lip and the head portion of the side molding, wherein the glass limiting lip and the head portion of the upper molding overlap and are connected at the upper molding, and wherein the glass limiting lip and the head portion of the side molding define a space therebetween.

2. A window molding as claimed in claim 1, wherein each of said upper and side moldings further includes an upper lip extending from the head portion toward the vehicle body and a lower lip projecting from the leg portion toward the vehicle body, the upper and lower lips being connected with the vehicle body.

3. A window molding as claimed in claim 2, wherein the upper lip, the lower lip and a side of the glass limiting lip in contact with the front window glass are made of soft resin material, and the other parts of the window molding are made of hard resin material.

4. A window molding as claimed in claim 1, wherein each of said upper and side moldings further includes an anchor portion projecting from the lower end of the leg portion toward the same direction of the glass limiting lip, and a glass engaging groove having a channel-shaped cross-section being defined by the leg portion, the glass limiting lip and the anchor portion.

5. A window molding as claimed in claim 1, wherein each of said upper and side moldings further includes a hooked lip projecting from the leg portion toward the vehicle body, the hooked lip being in contact with an inboard edge of the peripheral portion of the front window glass.

6. A window molding as claimed in claim 1, wherein said side molding has a rainwater guide groove of a channel shaped cross-section which is defined by the head portion, the strut portion and the glass limiting lip.

7. A window molding as claimed in claim 1, wherein a core wire formed into a rope made of glass fibers is embedded in each head portion.

8. A window molding as claimed in claim 1, wherein a hollow portion is formed between each head portion and each leg portion.

9. A window molding for an automotive vehicle, comprising:

an upper molding including:

a leg portion of the upper molding adapted to be disposed between a periphery of a front window glass of the automotive vehicle and a window frame of a vehicle body;

a glass limiting lip of the upper molding projecting from the leg portion of the upper molding and adapted to contact an outer board surface of the periphery of the front window glass; and a head portion of the upper molding connected to the leg portion and the glass limiting lip of the upper molding; and a side molding continuous with said upper molding, the side molding including:

a leg portion and a glass limiting lip of the side molding, wherein each is the same as the corresponding part of the upper molding;

a strut portion connected to the leg portion of the side molding, wherein a length of the strut portion and an angle between the strut portion and the glass limiting lip of the side molding both gradually increase from a first end of the side molding connected to the upper molding to a second end;

a head portion of the side molding connected to the strut portion; and a generally channel shaped rainwater guide groove defined by the head portion, the strut portion and the glass limiting lip of the side molding, wherein the guide groove gradually increases in groove volume from the first end to the second end.

10. A window molding installed along a clearance between a front window glass and a vehicle body, comprising:

a leg portion extending along the clearance;

a glass limiting lip extending along the clearance, said glass limiting lip being integral with said leg portion and perpendicularly projecting from said leg portion so as to contact an outer board surface of the periphery of the front window glass while said leg portion supports a side edge of the front window glass; and a strut portion extending along the clearance and being integral with said leg portion and said glass limiting lip, wherein a length of said strut portion and an angle between said strut portion and said glass limiting lip both gradually vary along the clearance.

* * * * *